US011720841B2

(12) United States Patent
Sakamoto

(10) Patent No.: US 11,720,841 B2
(45) Date of Patent: *Aug. 8, 2023

(54) MERCHANT ACTION RECOMMENDATION SYSTEM

(71) Applicant: PAYPAL, INC., San Jose, CA (US)

(72) Inventor: Ares Sakamoto, Austin, TX (US)

(73) Assignee: PayPal, Inc., San Jose, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/385,897

(22) Filed: Jul. 26, 2021

(65) Prior Publication Data

US 2021/0357826 A1 Nov. 18, 2021

Related U.S. Application Data

(63) Continuation of application No. 16/742,599, filed on Jan. 14, 2020, now Pat. No. 11,080,635, which is a
(Continued)

(51) Int. Cl.
*G06Q 10/00* (2023.01)
*G06Q 10/0633* (2023.01)
*G06Q 30/0201* (2023.01)

(52) U.S. Cl.
CPC ..... *G06Q 10/0633* (2013.01); *G06Q 30/0201* (2013.01)

(58) Field of Classification Search
USPC ....................................................... 705/7.27
See application file for complete search history.

(56) References Cited

U.S. PATENT DOCUMENTS 6,965,868 B1 11/2005 Bednarek
7,853,470 B2 12/2010 Sonnleithner et al.
(Continued)

OTHER PUBLICATIONS

Papagiannidis, Savvas, et al. "To immerse or not? Experimenting with two virtual retail environments." Information Technology & People 30.1 (2017): 163-188. (Year: 2017).*
(Continued)

*Primary Examiner* — Hafiz A Kassim
*Assistant Examiner* — Zahra Elkassabgi
(74) *Attorney, Agent, or Firm* — Haynes and Boone, LLP

(57) ABSTRACT

Systems and methods for recommending merchant actions include a physical merchant location having a plurality of beacon devices. A system provider device receives a plurality of first location information from the plurality of beacon devices that is collected from a customer beacon communication device that is associated with a customer. The system provider device also receives a plurality of second location information over the network from the plurality of beacon devices that is collected from a merchant beacon communication device that is associated with an asset of the merchant. The system provider device analyzes the plurality of first location information and the plurality of second location information to determine at least one merchant action recommendation related to the customer and the asset of the merchant and provides the at least one merchant action recommendation over the network for display on a display device.

20 Claims, 28 Drawing Sheets

Related U.S. Application Data continuation of application No. 14/191,290, filed on Feb. 26, 2014, now Pat. No. 10,535,027.

(60) Provisional application No. 61/909,070, filed on Nov. 26, 2013.

(56) References Cited

U.S. PATENT DOCUMENTS

| | | | |
|---|---|---|---|
| 8,032,409 | B1 | 10/2011 | Mikurak |
| 8,120,486 | B2 | 2/2012 | Rinkes |
| 8,478,692 | B2 | 7/2013 | Carlson et al. |
| 8,547,223 | B2 | 10/2013 | Midtun et al. |
| 8,606,611 | B1 | 12/2013 | Fedorov et al. |
| 8,719,098 | B2 * | 5/2014 | Burkhart ............... G06Q 30/06 705/14.65 |
| 9,665,881 | B1 * | 5/2017 | Ward ............... G06Q 30/0239 |
| 9,911,290 | B1 | 3/2018 | Zalewski et al. |
| 2002/0128907 | A1 | 9/2002 | Sato et al. |
| 2002/0178072 | A1 | 11/2002 | Gusler et al. |
| 2005/0177463 | A1 * | 8/2005 | Crutchfield ............ G06Q 30/06 705/27.2 |
| 2006/0133831 | A1 | 6/2006 | Rommelmann et al. |
| 2008/0270398 | A1 | 10/2008 | Landau et al. |
| 2009/0012704 | A1 | 1/2009 | Franco et al. |
| 2010/0217650 | A1 * | 8/2010 | Hartnell ............. G06Q 30/0201 705/7.29 |
| 2011/0276440 | A1 * | 11/2011 | Collins ................ G06Q 10/087 705/28 |
| 2012/0259732 | A1 | 10/2012 | Sasankan et al. |
| 2012/0278454 | A1 * | 11/2012 | Stewart ................. H04L 67/125 709/220 |
| 2012/0284216 | A1 | 11/2012 | Hamann et al. |
| 2013/0085804 | A1 | 4/2013 | Leff et al. |
| 2013/0179303 | A1 | 7/2013 | Petrou et al. |
| 2013/0215267 | A1 * | 8/2013 | Golan .................... G06V 20/52 348/143 |
| 2013/0268408 | A1 | 10/2013 | Mebed et al. |
| 2013/0268520 | A1 * | 10/2013 | Fisher ................ G06F 16/2455 707/723 |
| 2014/0257926 | A1 * | 9/2014 | Rasband ........... G06Q 30/0205 705/7.31 |
| 2014/0365334 | A1 * | 12/2014 | Hurewitz ........... G06Q 30/0613 705/26.41 |
| 2016/0196575 | A1 | 7/2016 | Uchida et al. |

OTHER PUBLICATIONS

International Application No. PCT/US2014/064074, International Search Report and Written Opinion dated Feb. 3, 2015, 10 pages.

Khakimdjanova L., et al., "Online Visual Merchandising Practice of Apparel E-Merchants", Journal of Retailing and Consumer Services, vol. 12, 2005, 12 pages.

Schafer B.J., et al., "E-Commerce Recommendation Applications", Data Mining and Knowledge Discovery, vol. 05, 2001, 39 pages.

* cited by examiner

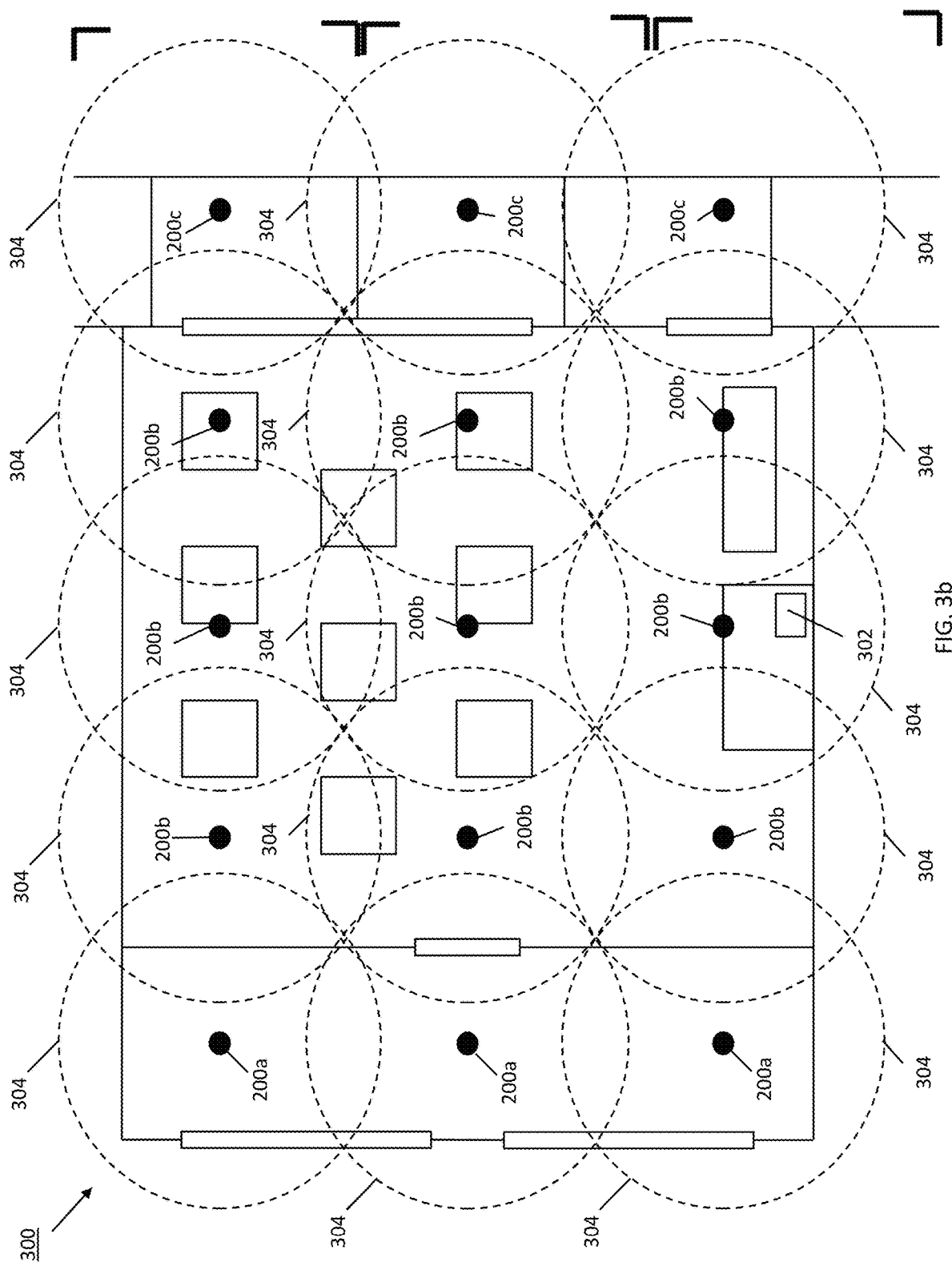

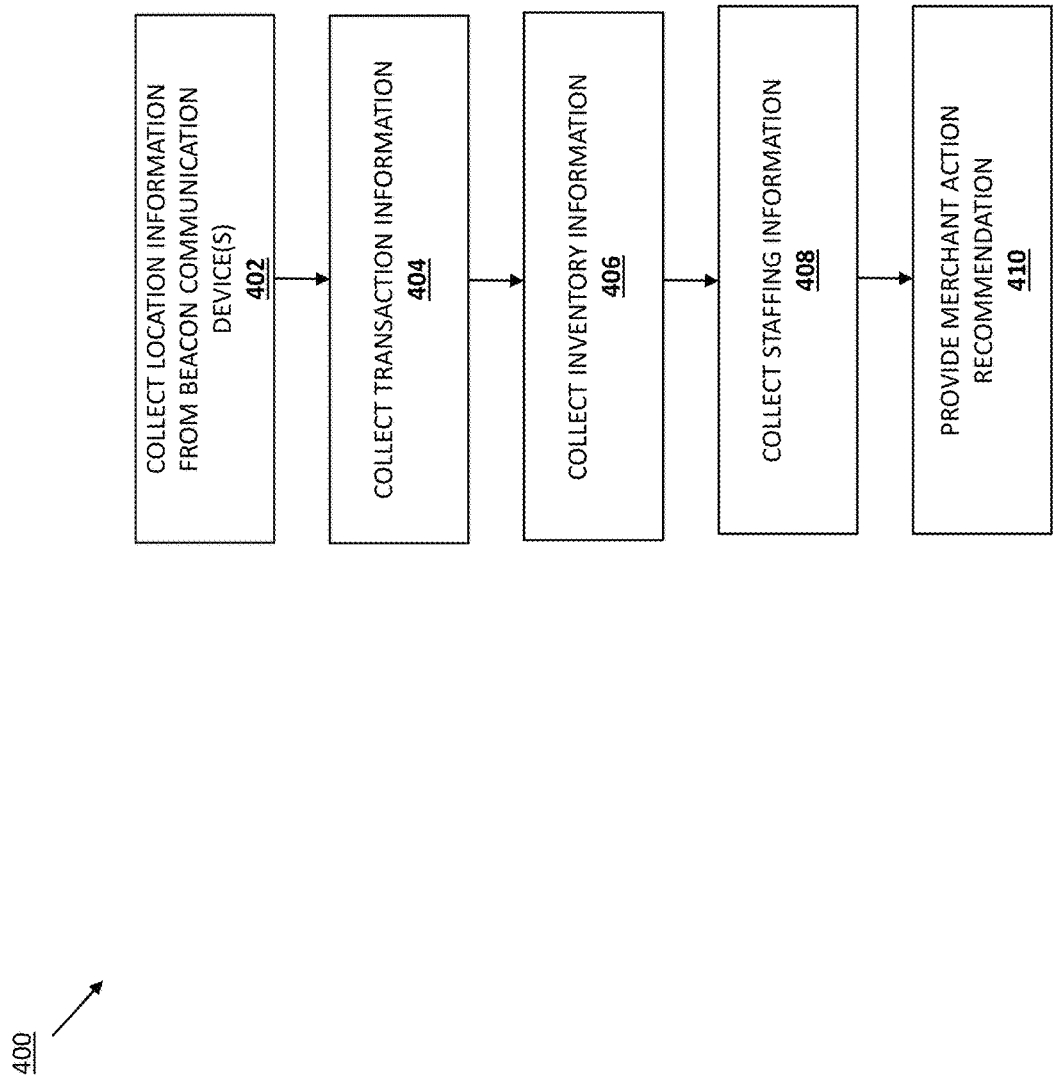

MERCHANT ACTION RECOMMENDATION SYSTEM

CROSS REFERENCE TO RELATED APPLICATIONS

The present application is a continuation of U.S. Non Provisional patent application Ser. No. 16/742,599, filed Jan. 14, 2020, which is a continuation of U.S. Non Provisional patent application Ser. No. 14/191,290 filed Feb. 26, 2014 which claims priority to U.S. Provisional Patent Application Ser. No. 61/909,070, filed on Nov. 26, 2013, each of which are hereby incorporated by reference in their entirety.

BACKGROUND

Field of the Invention

The present disclosure generally relates to online and physical merchant locations, and more particularly to a merchant action recommendation system for online and physical merchant locations.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Some payment service providers provide online and mobile payment services for merchants with either of both of online and physical merchant locations. For example, payment service providers may provide the online and/or mobile payment services discussed above, and in the course of doing so, collect data about customer payment habits with the merchants. However, such data is limited to transactions conducted between customers and merchants, and thus any attempt to analyze that data and provide actionable recommendations based on the results is limited to data collected from customers that have actually purchased something from that merchant or other merchants.

Thus, there is a need for an improved merchant action recommendation system.

BRIEF DESCRIPTION OF THE FIGURES

FIG. 3b is a schematic view illustrating an embodiment of the merchant action recommendation system of FIG. 3a with the beacon devices providing communication areas;

FIG. 4 is a flow chart illustrating a method for recommending merchant actions;

Figure 1:
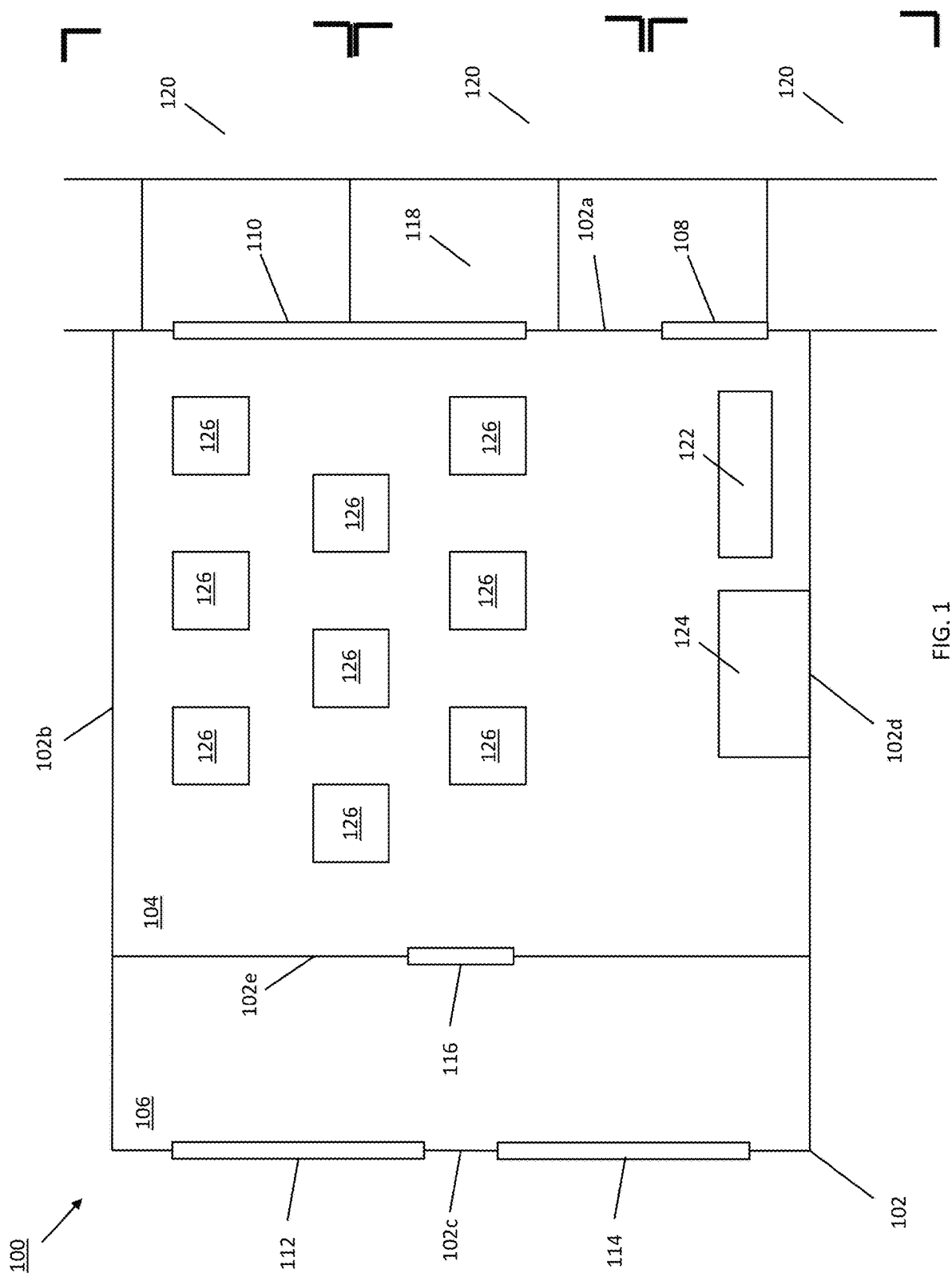
FIG. 1 is a schematic view illustrating an embodiment of a merchant physical location.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for recommending actions to merchants based on the movements of customers and merchant assets through a physical merchant location of the merchant. The merchant may provide a plurality of beacon devices throughout the physical merchant location, and in some cases outside of the physical merchant location, in order to collect data from customers through their customer beacon communication devices such as, for example, customers phones. In addition, the merchant may provide merchant beacon communication devices on assets associated with the merchant, which may include employees, products, product holders, and/or vehicles associated with the merchant (e.g., supply vehicles). The beacon devices may then operate to collect location information from the customer beacon communication devices and the merchant beacon communication devices, and that location information may be collected and analyzed to determined merchant action recommendations for the merchant that will result in higher efficiencies, revenue, and/or or a variety of other merchant criteria known in the art. For example, the location information from customers may be used to determine customer traffic patterns inside and outside of the merchant physical location, which may result in recommendations related to advertisements outside of the physical merchant location, configurations of the merchant physical location itself, and/or a variety of other recommendations discussed below. Similarly, the location information from merchant assets may be used to provide recommendations related to employee staffing, employee deployment, product placement, and/or a variety of other recommendations discussed below.

Referring now to FIG. 1, an embodiment of a merchant physical location 100 is illustrated. The merchant physical location 100 includes a merchant building 102 having a plurality of exterior walls 102a, 102b, 102c, and 102d that define a merchant physical location first area 104 and a merchant physical location second area 106 that are separated by an interior wall 102e. The exterior wall 102a includes an exterior door 108 (e.g., a "front" door in the illustrated embodiment) and an exterior window 110. The exterior wall 102c includes a plurality of exterior doors 112 and 114 (e.g., ("rear" or "shipping" doors in the illustrated embodiment). The interior wall 102e includes an interior door 116. An exterior walkway 118 (e.g., a sidewalk) is located opposite the exterior wall 102a from the merchant physical location first area 104, and a plurality of vehicle areas 120 is located adjacent the exterior walkway 118. The merchant physical location first area 104 includes a counter 122, a product shelf 124, and a plurality of product fixtures 126.

In one example, the merchant physical location 100 is a restaurant, and the merchant physical location first area 104 is a dining room with the plurality of product fixtures 126 being tables, while the merchant physical location second area 106 is a kitchen and supply area. In another example, the merchant physical location 100 is a clothing store, and the merchant physical location first area 104 is a clothing showroom with the plurality of product fixtures 126 being clothing racks, while the merchant physical location second area 106 is a clothing storage and supply area. However, while a few examples are discussed below, one of skill in the art in possession of the present disclosure will recognize that a wide variety of merchant physical locations will benefit from the teachings of the present disclosure and thus will fall within its scope.

Figure 2:
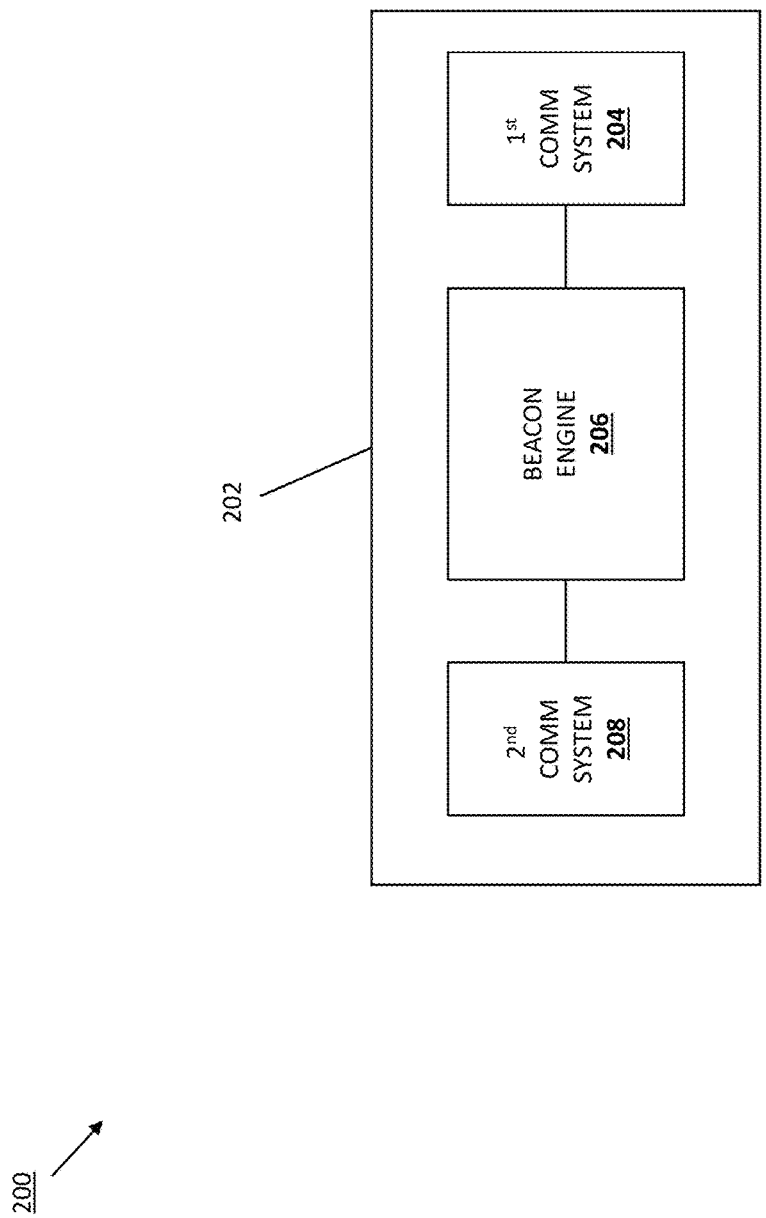
FIG. 2 is a schematic view illustrating an embodiment of a beacon device.

Referring now to FIG. 2, an embodiment of a beacon device 200 is illustrated. The beacon device 200 includes a chassis that houses a first communications system 204 such as, for example, a Wifi communications system. The first communications system 204 is coupled to a beacon engine 206 that may be provided by instruction on a memory system (not illustrated) in the beacon device 200 that, when executed by a processing system (not illustrated) in the beacon device 200, cause the processing system to perform the functions of the beacon device 200 discussed below. The beacon engine 206 is coupled to a second communication system 208 such as, for example, a Bluetooth® Low Energy (BLE) communication system. The beacon engine 206 may be configured to receive any of a variety of sensor signals through the second communication system 208 and transmit those sensor signals using the first communication system 205. While a few examples of communications components in the beacon device 200 have been described, one of skill in the art will recognize that other communications devices, as well as other components that have been omitted for clarity of discussion and illustrated, may be included in the beacon device 200 and will fall within the scope of the present disclosure. One of skill in the art will recognize that the components described above allow for the beacon device to be provided in a relatively small form factor such that it may be placed inconspicuously almost anywhere. The chassis 202 of the beacon device 200 may include any of a variety of features that allow for the coupling of the beacon device to different areas in a merchant physical location, discussed below.

Figure 3A:
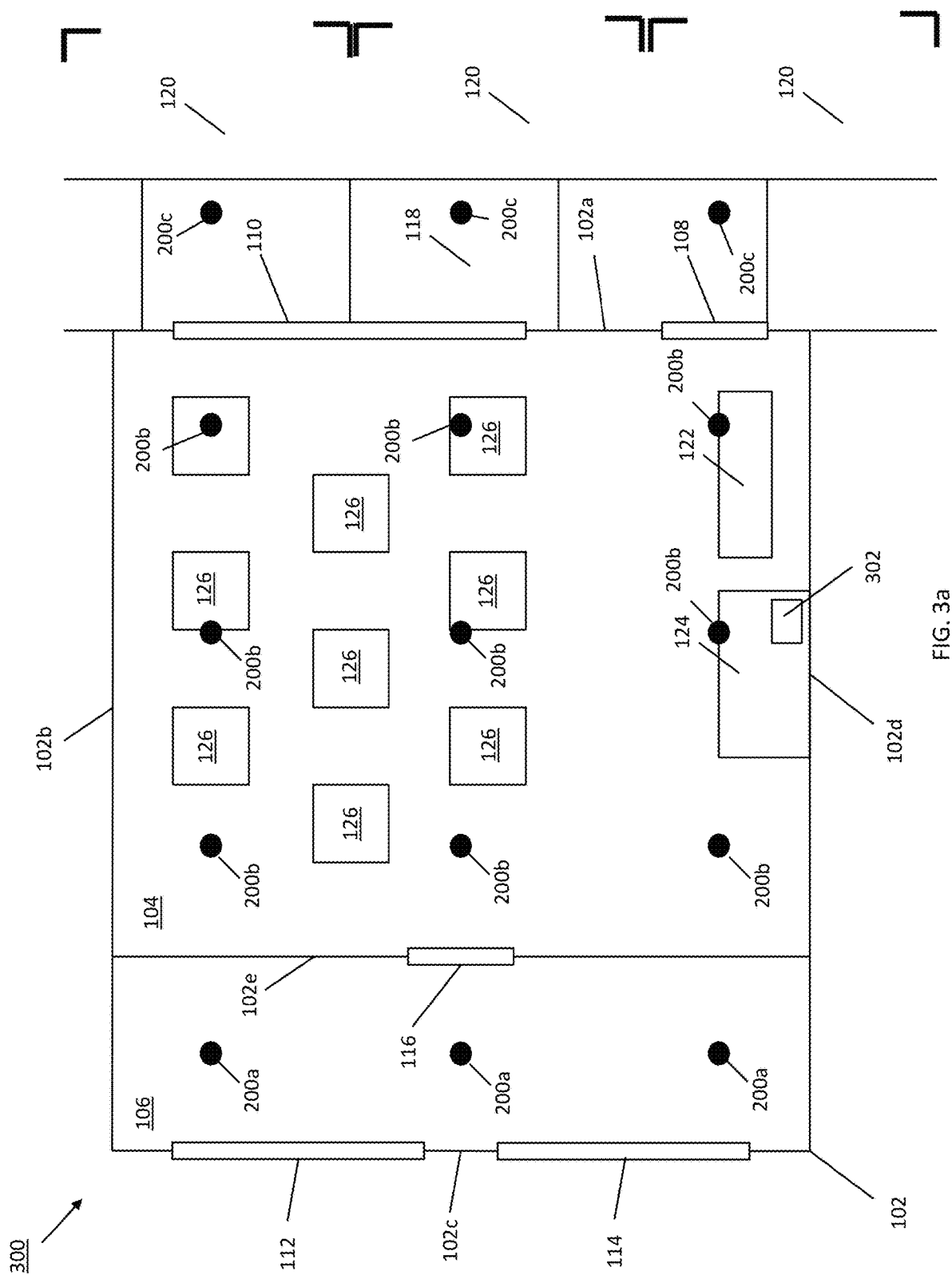
FIG. 3a is a schematic view illustrating an embodiment of a merchant action recommendation system that includes a plurality of the beacon devices of FIG. 2 in the merchant physical location of FIG. 1.

Referring now to FIGS. 3a and 3b, an embodiment of a portion 300 of a merchant action recommendation system 300 is illustrated. As illustrated in FIG. 3a, the merchant action recommendation system 300 is provided by positioned a plurality of the beacon devices 200, discussed above with reference to FIG. 2, in and around the merchant physical location 100, discussed above with reference to FIG. 1. In the illustrated embodiment, a plurality of beacon devices 200a may be positioned in the merchant physical location second area 106, a plurality of beacon devices 200b may be positioned in the merchant physical location first area 104, and a plurality of beacon devices 200c may be positioned adjacent the exterior walkway 118 and opposite the exterior wall 102a from the merchant physical location first area 104. As discussed above, the beacon devices 200 may be sized such that they may be inconspicuously positioned virtually anywhere in or around the merchant physical location 100. For example, the beacon devices 200a may be positioned on the ceiling of the merchant physical location second area 106; the beacon devices 200b may be positioned on the ceiling, on the product fixtures 126 (e.g., in a rack, under a table, etc.), on the counter 122, on the product shelf 124, etc., of the merchant physical location first area 104; and the beacon devices 200c may be positioned on an awning or overhang that is located above the exterior walkway 118. Each of the beacon devices 200 in the merchant action recommendation system 300 may be configured to wirelessly communicate, via its first communications system 204, with a merchant network communication device 302 such as, for example, a Wifi wireless router connected to a network such as the Internet.

Referring now to FIG. 3b, in operation, each of the beacon devices 200 is configured to create a communication area 304 with its second communications system 204. For example, the second communications system 204 in each beacon device 200 may be BLE communications device that provides an approximately 100 foot radius communications area. However, other communications systems providing other communications areas are envisioned as falling within the scope of the present disclosure. As can be seen in the illustrated embodiment, the beacon devices 200 may be positioned in and around the merchant physical location 100 such that the communications areas 304 abut, overlap, or otherwise provide coverage for any area of interest within and around the merchant physical location 100. As such, one of skill in the art in possession of the present disclosure will appreciate that different configurations of the beacon devices 200 within and around the merchant physical location 100 may be selected to cover any area within and around the merchant physical location 100 with a communications area 304. As discussed in further detail below, each of the beacon devices 200 are configured to communicate with beacon communication devices within their respective communications area 304 (e.g., using the second communication system 208) to collect data, and then send that data to the merchant network communication device 302 (e.g., using the first communication system 204) such that the data may be provided to a merchant device, a system provider device, and/or any other device operating to provide the merchant action recommendations discussed below.

In the embodiments illustrated and discussed below, the beacon devices 200 and their communications areas 304 are not illustrated for clarity of illustration and discussed, but it should be understood that the communications and retrieval of information from beacon communication devices, and that provision of that information to a system provider device, is accomplished using beacon devices providing communications areas such as the beacon devices 200 and communications areas 304 illustrated in FIGS. 3a and 3b. While a specific example of a merchant action recommendation system 300 is provided, one of skill in the art in possession of the present disclosure will recognize that a wide variety of different merchant physical locations may incorporate the beacon devices 200 in a variety of manners while remaining within its scope.

In the embodiments discussed below, the merchant action recommendation systems and methods involve a system provider using a system provider device to retrieve information collected by the beacon devices 200 through a network (e.g., the Internet). In such embodiments, the system provider may associate the merchant physical location 100 (or its merchant), the beacon devices 200, merchant devices, and/or other components of the system with a merchant physical location account in a database located in a non-transitory memory. As such, information received from the beacon devices and merchant devices may be associated with the merchant physical location account in the database, and any results of the analysis of that information may be stored in associated with that merchant physical location account. In other embodiments, the system provider device may be a merchant device that is local to the merchant physical location 100 and that communicates with the beacon devices 200 using the merchant network communication device 302.

For example, FIGS. 1, 3a, and 3b illustrate a merchant physical location 100 that is a single building, and the beacon devices 200 are positioned to provide communications areas 304 that cover the interior of that single building, the exterior walkway 118 outside the front of that single building, and a shipping area outside the rear of the single building. However, beacon devices 200 may be positioned virtually anywhere to retrieve information associated with a merchant physical location. For example, the merchant physical location may be located adjacent to or associated with a parking lot, and beacon devices may be positioned around that parking lot, at the entrances or exits of that parking lot, and/or anywhere else relative to that parking lot in order to collect and send information from beacon communication devices to the system provider device. In another example, the merchant physical location may be located in a mall, and beacon devices may be positioned around that mall, at the entrances or exits of that mall, and/or anywhere else relative to that mall in order to collect and send information from beacon communication devices to the system provider device. In some examples, the first communication system may be connected to Wifi networks available outside the merchant physical location in order to communicate collected information to a system provider device. In other examples, the first communication system may be a cellular communications system that allows the beacon devices to be positioned anywhere in range of a cellular communications tower, allowing beacon devices in the merchant to be positioned in virtually any physical location when providing the merchant action recommendation system.

Figure 5A:
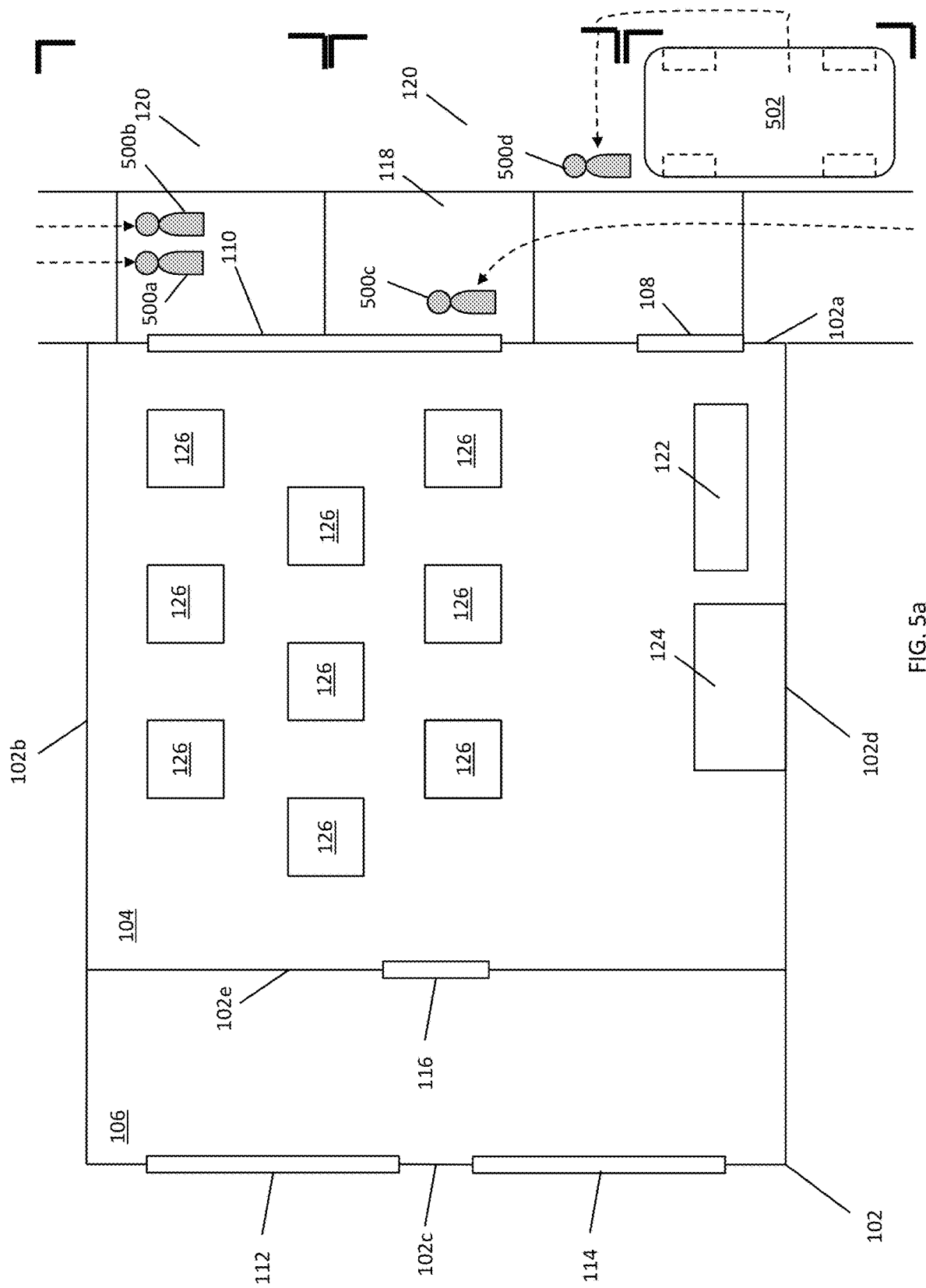
FIG. 5a is a schematic view illustrating an embodiment of customers at the merchant physical location of FIG. 1.

Referring now to FIGS. 4, 5a, 5b, 5c, 5d, and 5e, an embodiment of a method 400 for providing merchant action recommendations is illustrated. The method 400 begins at block 402 where location information is collected. Referring first to FIG. 5a, an embodiment of the collection of location information at block 402 is illustrated. In the embodiments, discussed below, the term "customer" is applied to people that participate in transactions with the merchant at the merchant physical location 100, as well as people that simply position themselves within range of a communication area 304 of a beacon device 200 in the merchant physical location 100 (e.g., potential customers). FIG. 5a illustrates a plurality of customers 500a, 500b, 500c, and 500d located on the exterior walkway 118 and vehicle areas 120. At block 402, the beacon devices (e.g., the beacon devices 200c illustrated in FIGS. 3a and 3b) operate to communicate with customer beacon communication devices on each of the customers 500a-d in order to collect location information associated with each of those customers 500a-d.

In an embodiment, the customer beacon communication devices on each of the customers 500a-d may be customer mobile phones that are configured to communicate with the second communications systems 208 in the beacon devices 200 when the customer mobile phones are located in the communications areas 304 of the beacon devices 200. For example, the customer mobile phones may include BLE communications systems that are configured to communicate with the BLE communications systems in the beacon devices 200 when the customer mobile phones are located in the communications areas 304 provided by those beacon devices 200. The BLE communications systems in the customer mobile phones may be configured to access any data (e.g., stored in the customer mobile phone, from sensors located in the customer mobile phone, over a network the customer mobile phone is connected to, in databases accessible by the customer mobile phone over the network, etc.) and provide that data to the beacon devices 200.

In a specific embodiment, the merchant action recommendation system is provided by a payment service provider such as, for example, PayPal, Inc. of San Jose, Calif., that provides merchant services to allow the merchant to track merchant activities, and payment services that allow customers and merchants to perform transactions with each other. In such embodiments, the merchants and customers may include accounts with the payment service provider such that the merchant includes a merchant account (or the merchant physical location account discussed above) with the payment service provider, and each customer includes a respective customer account with the payment service provider. Thus, at block 402, each of the customers 500*a-d* may include a customer account with a payment service provider that providers the merchant action recommendation system. In some embodiments, the customer mobile phone of each customer may include a payment service application that is linked to a customer account and that provides for automatic communication between the customer mobile phone and beacon device 200 when the customer mobile phone is located in a communications area 304 provided by the beacon device 200 (e.g., each of the customers 500*a-d* may have previously provided permission for the exchange of data between the customer mobile phones and the beacon devices 200).

Thus, at block 402, each of the customers 500*a*-500*d* includes a customer beacon communication device that is communicating with the beacon devices 200 (e.g., the beacon devices 200*c* of FIGS. 3*a* and 3*b*) when that customer is located in any of the communications areas 304. At block 402, the customer beacon communications devices of the customers 500*a-d* may operate to communicate location information available to or determined by the customer beacon communication devices to the beacon devices 200. In an embodiment, the customer beacon communication devices may be customer mobile phones that communicate location information retrieved from location determination devices (e.g., Global Positioning System (GPS) devices) in the customer mobile phones. In another embodiment, the beacon devices 200 may be configured to determine a location of the customer device using, for example, triangulation or other location determination techniques known in the art. As such, as each customer 500*a-d* moves through the communication areas 304 provided by the beacon devices 200, location information associated with that customer (e.g., retrieved by the beacon devices 200 from that customers mobile phone) is collected by the beacon devices 200 (e.g., via its first communication system 204) and sent by the beacon devices 200 (e.g., via operation of its beacon engine 206 and use of its second communication system 208) over the network to the system provider device. Thus, as the customers 500*a*, 500*b*, and 500*c* move along the exterior walkway 118, their changing locations may be collected. Similarly, as the customer 500*d* arrived in their vehicle 502, positioned their vehicle 502 in the vehicle area 120, and exited their vehicle 502, their changing location may be collected. In some embodiments, the vehicle 502 may include a customer beacon communication device that allows for the retrieval of location information from the vehicle 502 in substantially the same manner as described above.

Figure 5B:
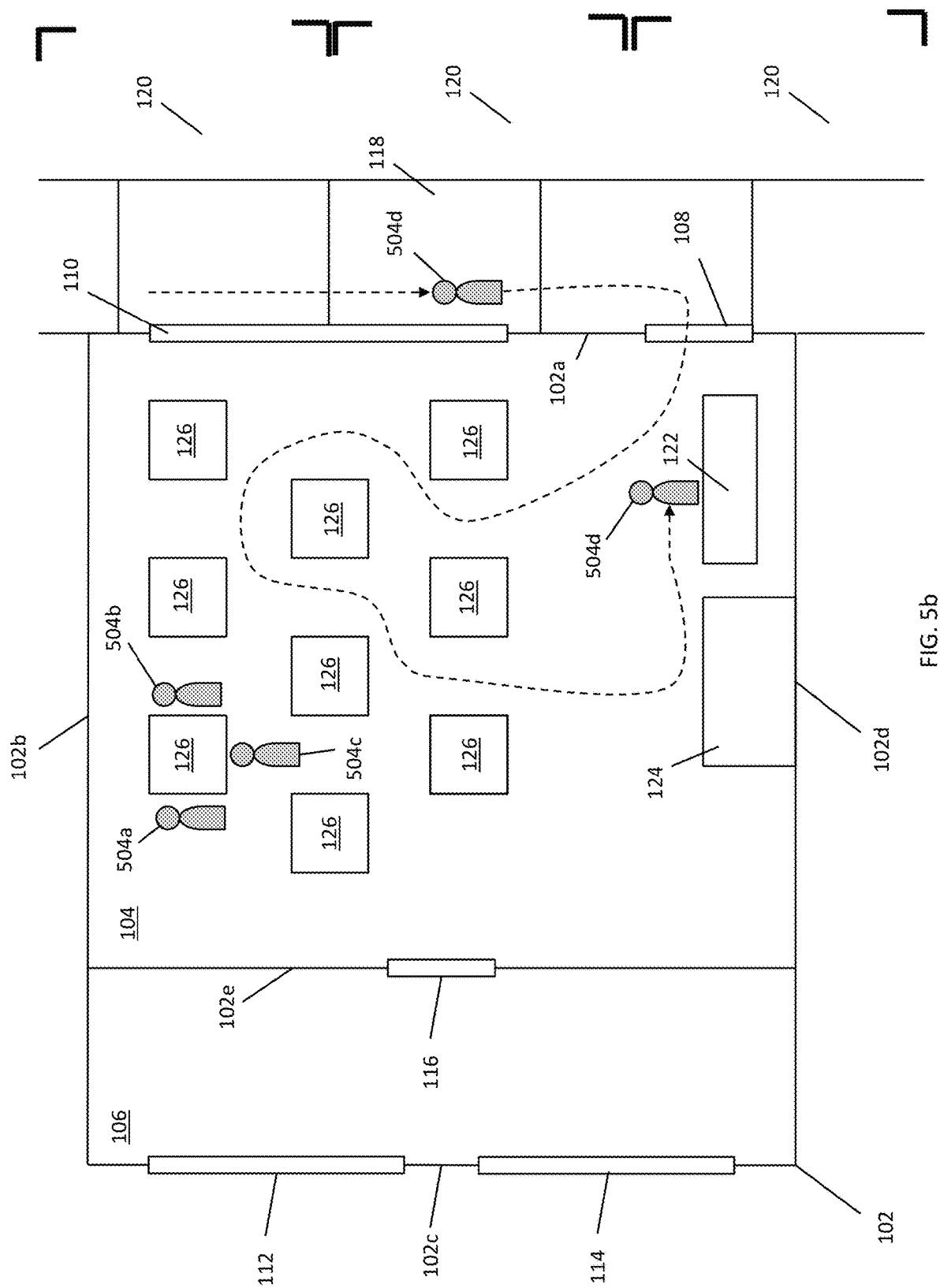
FIG. 5b is a schematic view illustrating an embodiment of customers at the merchant physical location of FIG. 1.

Referring now to FIG. 5*b*, another embodiment of the collection of location information at block 402 is illustrated. FIG. 5*b* illustrates a plurality of customers 504*a*, 504*b*, 504*c* located in the merchant physical location first area 104, and a customer 504*d* moving from the exterior walkway 118 and through the merchant physical location first area 104. Similarly as discussed above, location information may be retrieved from the customer beacon communication devices of each of those customers 504*a-d*. In the illustrated example, the customers 504*a-c* may be seated at a table, or congregating around a product rack, while the customer 504*d* may be moving along the exterior walkway 118, enter the merchant physical location first area 104, and move throughout the merchant physical location first area 104.

While a few examples have been illustrated and described, one of skill in the art will recognize how location information of customers may be retrieved using beacon devices position anywhere in or around the merchant physical location 100 and used to track the location of those customers in, around, and/or relative to the merchant physical location 100. As such, customers may be tracked entering, moving about, parking in, and exiting a parking lot; entering, moving about, and exiting a mall; moving past merchant physical locations; entering, moving about, and existing merchant physical locations; and/or moving through any location covered by a communication area 304 of a beacon device 200. Any location information retrieved from the customer beacon communication device of a given customer may then be associated with that customer (e.g., via a customer account) and/or the merchant (e.g., via a merchant account or merchant physical location account) such that for the merchant physical location 100, collected location information associated with any particular customer may be distinguished from collected location information associated with other customers.

While the examples above discuss the collection of location information, any information available to the customer beacon communication device may also be collected. For example, temperature information from temperature sensors, humidity information from humidity sensors, pressure information from pressures sensors, physiological information from physiological sensors, and/or any other sensed information may be communicated from the customer beacon communication device to the beacon devices in substantially the same manner as discussed above for the location information. Furthermore, multiple different types of sensed information may be collected from a given customer beacon communication device, allowing that information to be associated (e.g., location and temperature information) such that trends around the merchant physical location 100 (e.g., a temperature profile within the merchant physical location) may be determined.

The method 400 the proceeds to block 404 where transaction information is collected. In an embodiment, any of the customers discussed above may enter the merchant physical location 100 and perform a transaction with the merchant in order to purchase products and/or services. For example, a merchant may use a merchant device to perform transactions with customers by sending transaction information to the system provider device (e.g., a payment service provider), and that transaction information is collected by the system provider device and associated with the merchant (e.g., via a merchant account or merchant physical location account) and/or the customer (e.g., via a customer account) in a database. In some embodiments, the customer may use a customer device (e.g., a customer mobile phone) to participate in the transaction. Following block 404 of the method 400, transaction information associated with a plurality of transactions with different customers is associated with the merchant in a database, and transactions may be further associated with the customers with whom they were made.

The method 400 the proceeds to block 406 where inventory information is collected. In an embodiment, inventory may be sent or received by the merchant at block 406, and the inventory information may be reported to the system provider device for collection. For example, inventory actions may occur in the merchant physical location second area 106, and a merchant or merchant employee may use a merchant device to report the receipt of inventory, the sending of inventory, the destruction of inventory, and/or any other inventory information known in the art. That inventory information is collected by the system provider device and associated with the merchant (e.g., via a merchant account or merchant physical location account), an inventory supplier, and/or an inventory receiver in a database. Following block 406 of the method 400, inventory information associated with a plurality of inventory actions with different inventory entities is associated with the merchant in a database, and inventory actions may be further associated with the inventory entities with whom they were made.

The method 400 the proceeds to block 408 where staffing information is collected. In an embodiment, staff (e.g., merchant employees) may work at the merchant physical location, and staffing information may be reported to the system provider device for collection. For example, staff scheduling information may be entered into a merchant device, merchant employees may check in and out of the merchant device when entering and leaving work at the merchant physical location 100, and/or other similar staffing information may be generated by the merchant employees in performing their jobs. That staffing information is collected by the system provider device and associated with the merchant (e.g., via a merchant account or merchant physical location account), the merchant employees, and/or the hours of operation of the merchant physical location 100 in a database. Following block 408 of the method 400, staffing information is associated with the merchant in a database.

The method 400 then proceeds to block 410 where merchant action recommendations are provided. FIGS. 5c, 5d, 5e, and 5f provide a few examples of how the data collected at blocks 402, 404, 406, and 408 may be analyzed by the system provider device in order to determine and provide merchant action recommendations. In those examples, a merchant device receives the merchant action recommendations from a system provider device over a network and displays those merchant action recommendations on a merchant action recommendation screen that is displayed on a display device of the merchant device. The merchant device that displays the merchant action recommendation screens may include a mobile computing device, a desktop computing device, a wearable computing device, and/or any other computing device having a display screen capable of displaying merchant action recommendations.

Figure 5C:
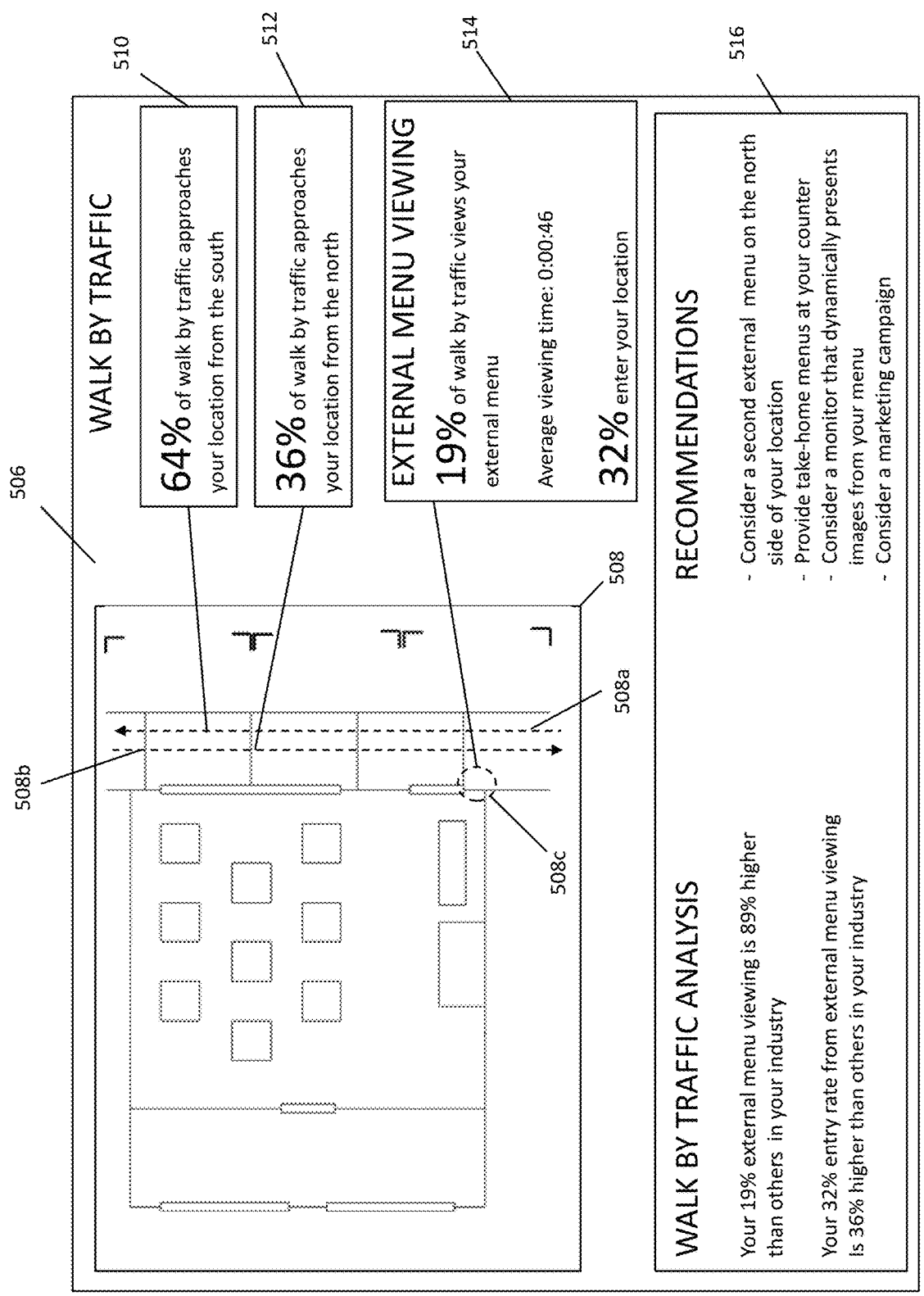
FIG. 5c is a screen shot view illustrating an embodiment of a merchant action recommendation screen displayed on a merchant device.

FIG. 5c illustrates a merchant action recommendation screen 506 including a merchant physical location map 508 that provides a visual layout of the merchant physical location 100, discussed above. In the embodiment of FIG. 5c, the system provider device has analyzed the location information collected at block 402 to determine traffic patterns of customers on the exterior walkway 118 and into the merchant physical location first area 104. As illustrated in FIG. 5c, a plurality of traffic pattern indicators 508a, 508b, and 508c are provided on the physical location map 508. A first traffic pattern analysis box 510 is associated with the traffic pattern indicator 508a and informs the merchant that 64% of walk by traffic approaches from the south of the merchant physical location 100. A second traffic pattern analysis box 512 is associated with the traffic pattern indicator 508b and informs the merchant that 36% of walk by traffic approaches from the north of the merchant physical location 100. A third traffic pattern analysis box 514 is associated with the traffic pattern indicator 508c and informs the merchant that 19% of walk by traffic stops to view an external menu (e.g., provided by the merchant such that it is viewable from the exterior walkway 118) for an average of 46 seconds, and 36% of those that stop to view the external menu enter the merchant physical location 100. The merchant action recommendation screen 506 also includes an analysis and recommendation box 516 that provides comparisons to walk-by traffic statistics for similar merchants (e.g., collected by other merchant action recommendations systems) such as, for example, the percentage of walk by traffic that views an external menu and the percentage of external menu viewing customers that enter the merchant physical locations, and recommends merchant actions such as, for example, adding a second external menu at a position where the majority of traffic approaches the merchant physical location 100, providing take-home menus, providing a monitor displaying menu images at a position where the majority of traffic approaches the merchant physical location 100, and considering a marketing campaign.

Figure 5D:
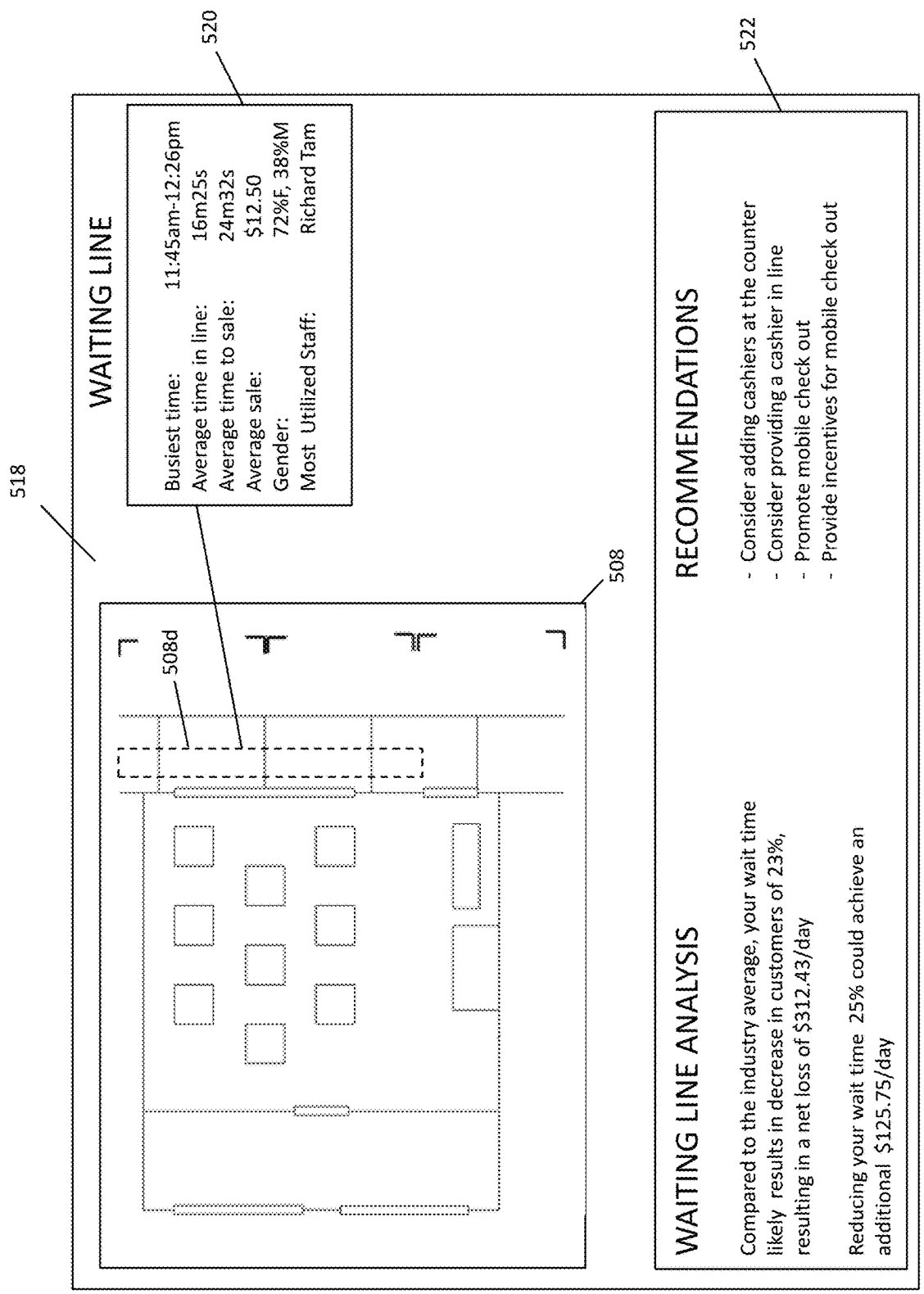
FIG. 5d is a screen shot view illustrating an embodiment of a merchant action recommendation screen displayed on a merchant device.

FIG. 5d illustrates a merchant action recommendation screen 518 including the merchant physical location map 508 that provides the visual layout of the merchant physical location 100, discussed above. In the embodiment of FIG. 5d, the system provider device has analyzed the location information collected at block 402 and the transaction information collected at block 404 to determine traffic patterns of customers on the exterior walkway 118 and their results on sales for the merchant. As illustrated in FIG. 5c, a traffic pattern indicator 508d that is associated with a line for the merchant physical location 100 is provided on the physical location map 508. A traffic pattern analysis box 520 is associated with the traffic pattern indicator 508d and informs the merchant about a plurality of statistics associated with the traffic pattern indicator 508d including, in the illustrated embodiment, a busiest time for the line, an average time each customer waits in the line, an average time it takes for a customer to wait in the line and complete a sale, an average sale for a customer waiting in the line, a gender breakdown for customers waiting in the line, an a merchant employee most often used by customers waiting in the line. The merchant action recommendation screen 518 also includes an analysis and recommendation box 522 that provides comparisons to line waiting statistics for similar merchants (e.g., collected by other merchant action recommendations systems) such as, for example, the net loss in revenue per day based on a decrease in customers due to the average wait time, as well as an increased revenue that could be realized by reducing that wait time, and recommends merchant actions such as, for example, adding cashiers at the counter during the busy periods, providing an in-line cashier, and promoting and providing incentives for mobile check out.

Figure 5E:
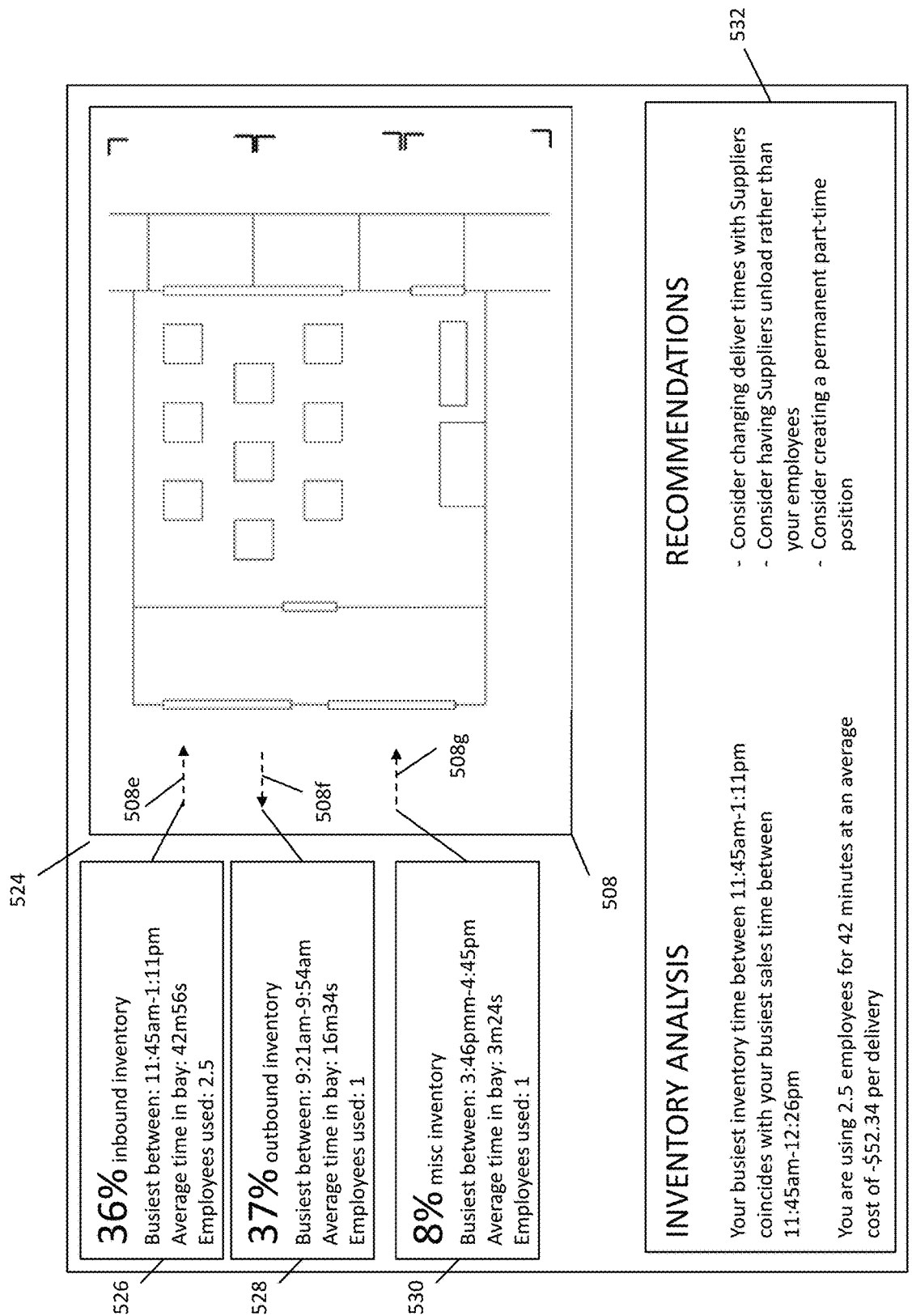
FIG. 5e is a screen shot view illustrating an embodiment of a merchant action recommendation screen displayed on a merchant device.

FIG. 5e illustrates a merchant action recommendation screen 524 including the merchant physical location map 508 that provides the visual layout of the merchant physical location 100, discussed above. In the embodiment of FIG. 5e, the system provider device has analyzed the location information collected at block 402, the inventory information collected at block 406, and the staffing information collected at block 408 to determine inventory and staffing patterns. As illustrated in FIG. 5e, inventory pattern indicators 508e, 508f, and 508g that are associated with received and sent inventory from the merchant physical location 100 are provided on the physical location map 508.

An inventory pattern analysis box 526 is associated with the inventory pattern indicator 508e and informs the merchant about a plurality of statistics associated with the inventory pattern indicator 508e including, in the illustrated embodiment, a busiest time for inbound inventory, an average time that inbound inventory is located in the merchant physical location second area 106 before being stocked, and the number of employees used for that inbound inventory. An inventory pattern analysis box 528 is associated with the inventory pattern indicator 508f and informs the merchant about a plurality of statistics associated with the inventory pattern indicator 508f including, in the illustrated embodiment, a busiest time for outbound inventory, an average time that outbound inventory is located in the merchant physical location second area 106 before leaving the merchant physical location 100, and the number of employees used for that outbound inventory. An inventory pattern analysis box 530 is associated with the inventory pattern indicator 508g and informs the merchant about a plurality of statistics associated with the inventory pattern indicator 508g including, in the illustrated embodiment, a busiest time for miscellaneous inbound inventory, an average time that miscellaneous inbound inventory is located in the merchant physical location second area 106 before being stocked, and the number of employees used for that miscellaneous inbound inventory.

The merchant action recommendation screen 524 also includes an analysis and recommendation box 532 that provides an analysis of the inventory actions such as, for example, that the busiest inventory time coincides with the merchant's busiest sales time (e.g., see, the traffic pattern analysis box 520 of FIG. 5d) and the cost to the merchant for paying employees during that time, and recommends merchant actions such as, for example, changing inventory delivery times so that they do not coincide with busy sales times, having inventory suppliers unload inventory rather than merchant employees, and creating a permanent part time position for the busy inventory times.

While a few examples of merchant action recommendation screens have been described, one of skill in the art in possession of the present disclosure will recognize how the merchant action recommendation system 300 may collect any variety of information and use that information to analyze the merchant business with regard to customers, transactions, employees, and inventory to determine inefficiencies and make recommendations to address those inefficiencies. For example, referring back to FIG. 5b, the system provide device may analyze the location information collected at block 402 to determine in-store behaviors such as preferred tables and seating locations of customers, preferred clothing racks or products types of customers, preferences of groups of customers, etc. Furthermore, the system provide device may analyze the location information collected at block 402 to determine other traffic pattern behaviors such as common paths for customers, common paths for groups of customers, common paths for all customers, total times customers spend in the merchant physical location, common locations for groups of customers, most popular locations in the merchant physical location for customers, customer traffic bottlenecks, the direction that customers approach the merchant physical location from, the direction that customers exit the merchant physical location to, the visibility and effectiveness of marketing or menus, restroom usage, etc.

Further still, the system provider device may analyze the location information collected at block 402 to determine other customer and/or sales behaviors such as the time a customer spends at any area within the merchant physical location, the total time or percentage of time customers spend in different areas of the merchant physical location, the sales performance of different areas of the merchant physical location, the time it takes customers to first interact with a merchant employee, the time spent by customers with merchant employees, the number of merchant employees customers interact with, the path and time for a customer to reach the counter 122, the time customers spend at the counter 122, the path and time it takes to close a sale, the automatic assignment of a merchant employee to a customer based on proximity, etc. Thus, the location information, transaction information, staffing information, and/or inventory information may be used to provide recommended merchant actions to achieve vastly greater efficiencies than are possible with conventional systems.

Figure 6:
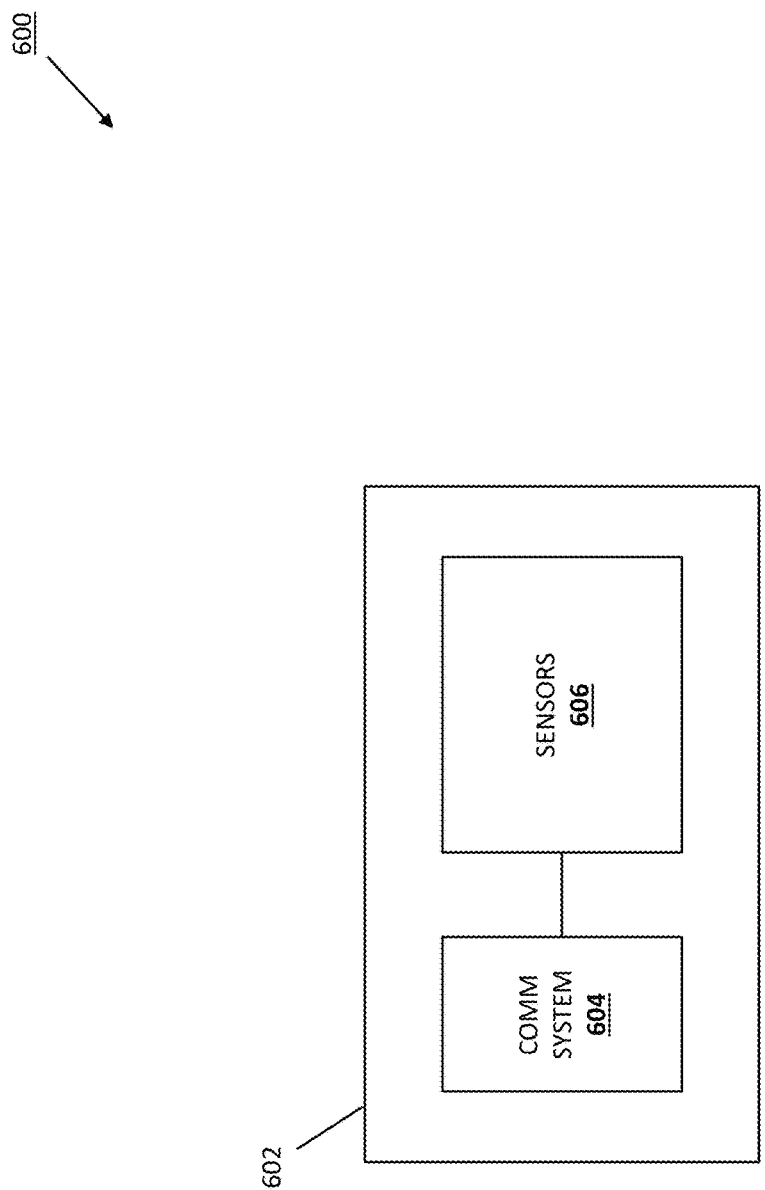
FIG. 6 is a schematic view illustrating an embodiment of a merchant beacon communication device.

Referring now to FIG. 6, an embodiment of a merchant beacon communication device 600 is illustrated that can greatly expand the functionality of the merchant action recommendation systems discussed above. The merchant beacon communication device 600 includes a chassis 602 housing a communication system 604 such as, for example, a BLE communication system similar to the BLE communication system discussed above for the customer beacon communication devices, that operates to communicate with the beacon devices 200 (e.g., via the second communication systems 208). One or more sensors 606 are located in the chassis 602 and coupled to the communication system 604. In the embodiments discussed below, the sensors 606 include a location determination device such as for example, a GPS device. However, other sensors 606 may include temperature sensors, humidity sensors, gyroscopes, accelerometers, magnetometers, barometric pressure sensors, battery/voltage sensors, light sensors, tilt sensors, touch sensors, pressure sensors, potentiometers, gas sensors, vibration sensors, heart beat sensors, and/or a variety of other sensors known in the art. In many embodiments, the relatively small size of the components of the merchant beacon communication device 600 allows the chassis 602 to be relatively small and provided as (or included in) an employee badge, and adhesive sticker, a tag, and/or a variety of other form factors that allow the merchant beacon communication device 600 to be coupled to merchant assets such as, for example, merchant employees, merchant products, merchant product holders, merchant product transport devices, merchant vehicles, and/or a variety of other merchant assets known in the art. As discussed in further detail below, the merchant beacon communication devices may be provided on any merchant asset to provide the data to the merchant action recommendation system related to that merchant asset for analysis and the provision of recommendations to the merchant.

Figure 7:
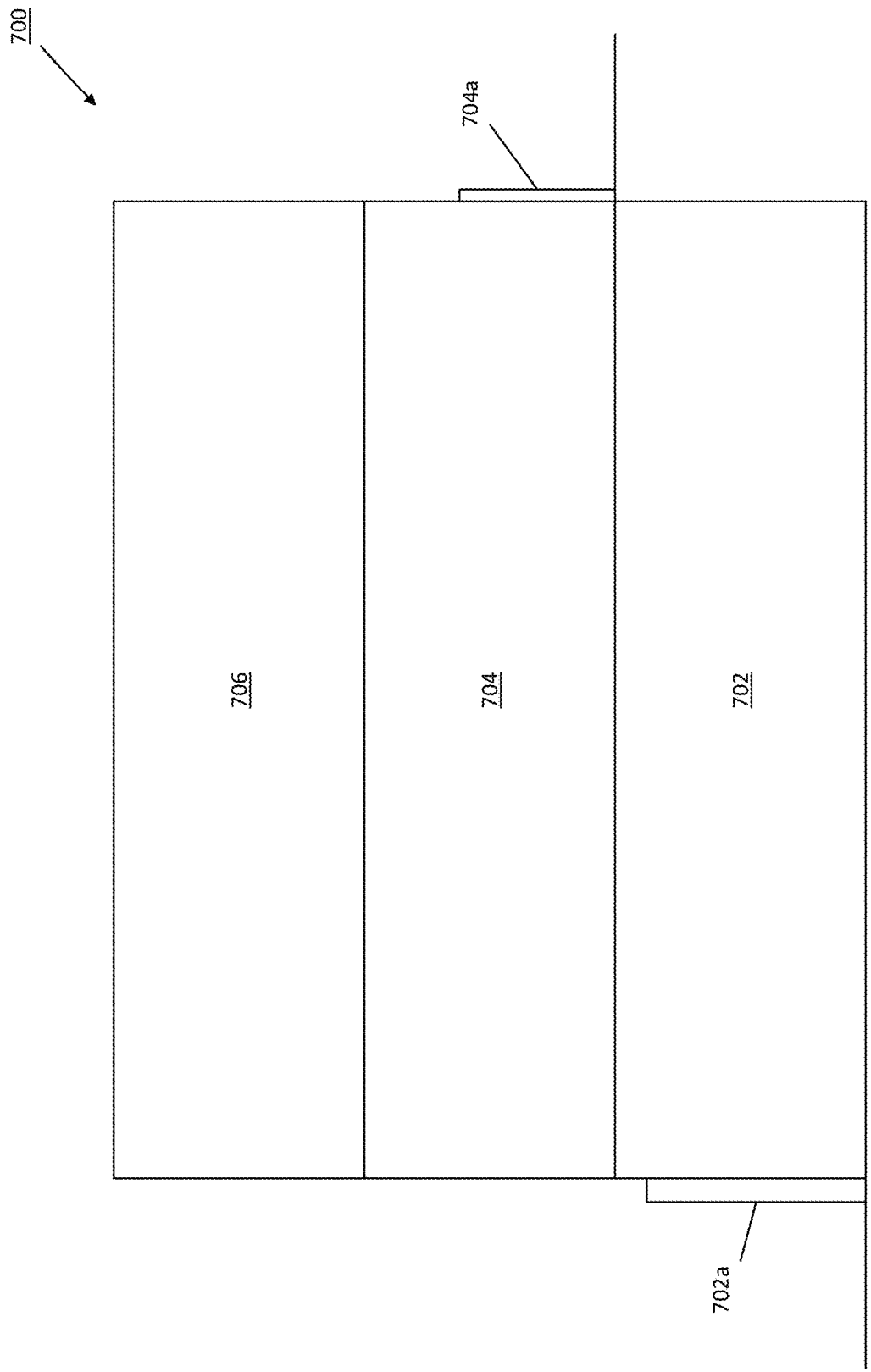
FIG. 7 is a schematic view illustrating an embodiment of a merchant physical location.

Referring now to FIG. 7, an embodiment of a multi-level merchant physical location 700 is illustrated that includes an inventory level 702 having an inventory door 702a, a primary level 704 having a front door 704, and an upper level 706. In the embodiments discussed below, each of the inventory level 702, the primary level 704, and the upper level 706 of the merchant physical location 700 include beacon devices 200 in substantially the same manner as described above with reference to the merchant action recommendation system 300 of FIGS. 3a and 3b, with each of the beacon devices also configured to report the level that they are located on such that location information received from a beacon device 200 on the any of the inventory level 702, the primary level 704, and the upper level 706 may be distinguished from location information received from a beacon device 200 on another level in the merchant physical location 700.

Figure 8:
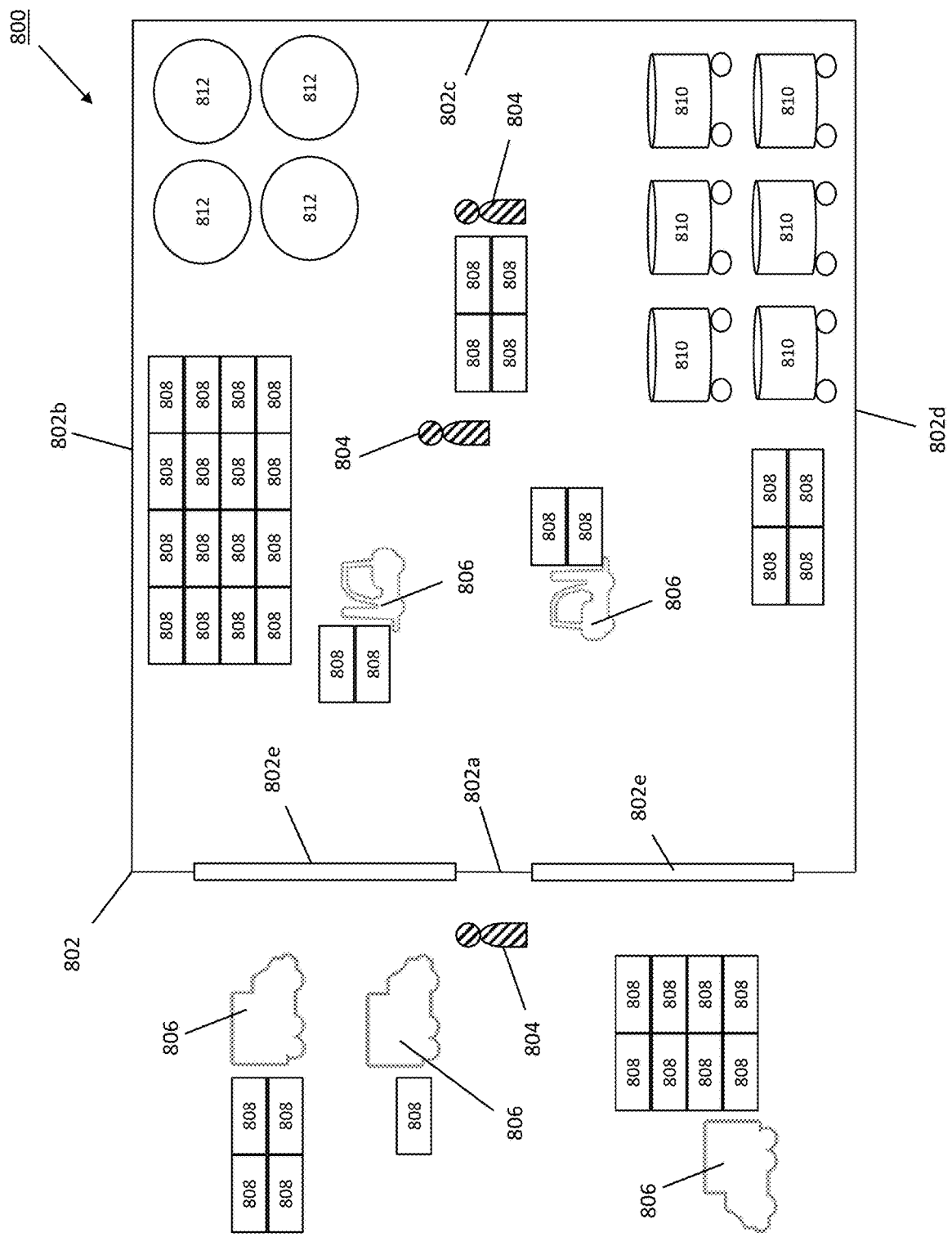
FIG. 8 is a schematic view illustrating an embodiment of an inventory level in the merchant physical location of FIG. 7.

Referring now to FIG. 8, an embodiment of a portion of a merchant action recommendation system 800, is illustrated. The merchant recommendation system 800 includes an inventory level 802, which may be the inventory level 702 discussed above with reference to FIG. 7. The inventory level 802 includes a plurality of exterior walls 802a, 802b, 802c, and 802d, with a pair of inventory doors 802e located on the exterior wall 802a. The merchant action recommendation system 800 includes a plurality of merchant employees 804, each of which includes an employee badge or other wearable article within which is incorporated a merchant beacon communication device 600. The merchant action recommendation system 800 also includes a plurality of merchant associated vehicles 806 (e.g., merchant owned vehicles, merchant supplier owned vehicles, etc.), each of which includes a merchant beacon communication device 600 (e.g., adhered or connected to the vehicle, included as part of the vehicle, etc.) The merchant action recommendation system 800 also includes a plurality of products 808, each of which includes a merchant beacon communication device 600 (e.g., including an adhesive such that the merchant beacon communication device 600 may be adhered to the product box). The merchant action recommendation system 800 also includes a plurality of containers 810, each of which includes a merchant beacon communication device 600 (e.g., including an adhesive such that the merchant beacon communication device 600 may be adhered to the product box). The merchant action recommendation system 800 also includes a plurality of racks or product holders 812, each of which includes a merchant beacon communication device 600 (e.g., including an adhesive such that the merchant beacon communication device 600 may be adhered to the product box).

As discussed in further detail below, by including the merchant beacon communication devices 600 on each of the employees 804, merchant associated vehicles 806, products 808, containers 812, and product racks/holders 812, the beacon devices 200 located throughout the inventory level 802 may communicate with each of the merchant beacon communication devices 600 to receive a variety of information from the sensors 606. As such, the location, temperature, humidity, orientation, forces, pressure, and/or other sensed properties may be periodically reported from each of the employees 804, merchant associated vehicles 806, products 808, containers 812, and product racks/holders 812 to the system provider device, and associated by the system provider device with the inventory level 702/802 of the merchant physical location 700.

Figure 9:
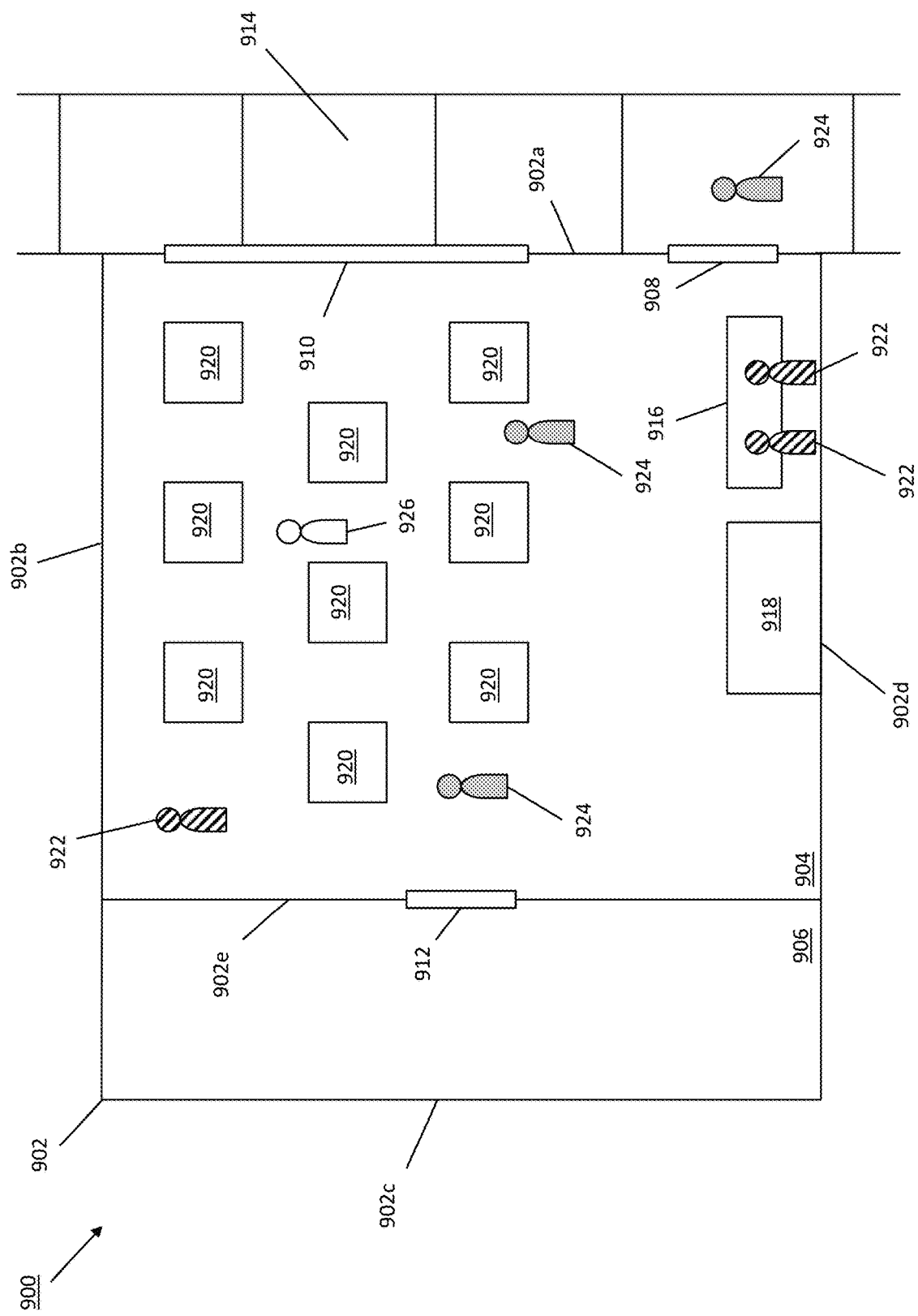
FIG. 9 is a schematic view illustrating an embodiment of a primary level in the merchant physical location of FIG. 7.

Referring now to FIG. 9, an embodiment of a portion of a merchant action recommendation system 900, is illustrated. The merchant recommendation system 900 includes a primary level 902, which may be the primary level 704 discussed above with reference to FIG. 7. The primary level 902 includes a plurality of exterior walls 902a, 902b, 902c, and 902d that define a merchant physical location first area 904 and a merchant physical location second area 906 that are separated by an interior wall 902e. The exterior wall 902a includes an exterior door 908 (e.g., a "front" door in the illustrated embodiment) and an exterior window 910. The interior wall 902e includes an interior door 912. An exterior walkway 914 (e.g., a sidewalk) is located opposite the exterior wall 902a from the merchant physical location first area 904. The merchant physical location first area 904 includes a counter 916, a product shelf 918, and a plurality of product fixtures 920.

The merchant action recommendation system 900 includes a plurality of merchant employees 922, each of which includes an employee badge or other wearable article within which is incorporated a merchant beacon communication device 600. The merchant action recommendation system 800 also includes a plurality of physical customers 924, which may be substantially similar to the customers 500 and 504 discussed above with reference to FIG. 5, and that each include a respective customer beacon communication device. In addition, the merchant action recommendation system 900 includes representations of known virtual customers 926, one of which is illustrated as located in an area of the primary level 902 determined by the system provider device, discussed in further detail below.

In an embodiment, the system provider device is configured to monitor merchant virtual locations (e.g., a merchant online store) of the merchant that operates the merchant physical location and detect known virtual customers (e.g., customers that are registered with, logged into, and/or otherwise identifiable through the merchant's online store) viewing and/or purchasing products in the merchant virtual location. Furthermore, the system provider device is also configured to retrieve location information from the merchant beacon communication devices on the products in the primary level 902 to determine their relative locations within the primary level 902. The system provider device may then operate to determine an area in the primary level 902 that includes the product being browsed by the known virtual customer 926 at the merchant virtual location, and provide the representation of the known virtual customer 926 adjacent the physical location in the primary level 902 that includes the product that that known virtual customer is browsing in the merchant virtual location.

For example, the system provider may determine that a known customer is viewing a particular jacket at the merchant's online store, and in response may access the merchant physical location account to determine the location of that jacket in the merchant physical location. In response to determining that the jacket being viewed by the known virtual customer in the merchant virtual location is located in a particular product fixture 920, the system provider device may provide the representation of the known virtual customer 926 adjacent that product fixture 920. Thus, while the employees 922 and physical customers 924 of FIG. 9 are actually located in the primary level 902, the known virtual customer 926 illustrated in FIG. 9 is a representation of where the system provider device determines that customer would be based on the product the customer is viewing at the merchant virtual location and the known location of that product in the merchant physical location.

The merchant action recommendation system 900 may also include a plurality of products (e.g., located in the product fixtures 920), each of which includes a merchant beacon communication device 600 (e.g., including an adhesive such that the merchant beacon communication device 600 may be adhered to the product box). The merchant action recommendation system 900 may also provide a merchant beacon communication device 600 on each of the product fixtures 920. As discussed in further detail below, by including the merchant beacon communication devices 600 on each of the employees 922, products, and product fixtures 920, as well as the customers including customer beacon communication devices, the beacon devices located throughout the primary level 902 may communicate with each of the merchant beacon communication devices 600 to receive a variety of information from the sensors 606, as well as communicate with the customer beacon communication devices as discussed above. As such, the location, temperature, humidity, orientation, forces, pressure, and/or other sensed properties may be periodically reported from each of the employees 804, products, product fixtures 920, and customers to the system provider device and associated with the primary level 704/902 of the merchant physical location 700.

Figure 10:
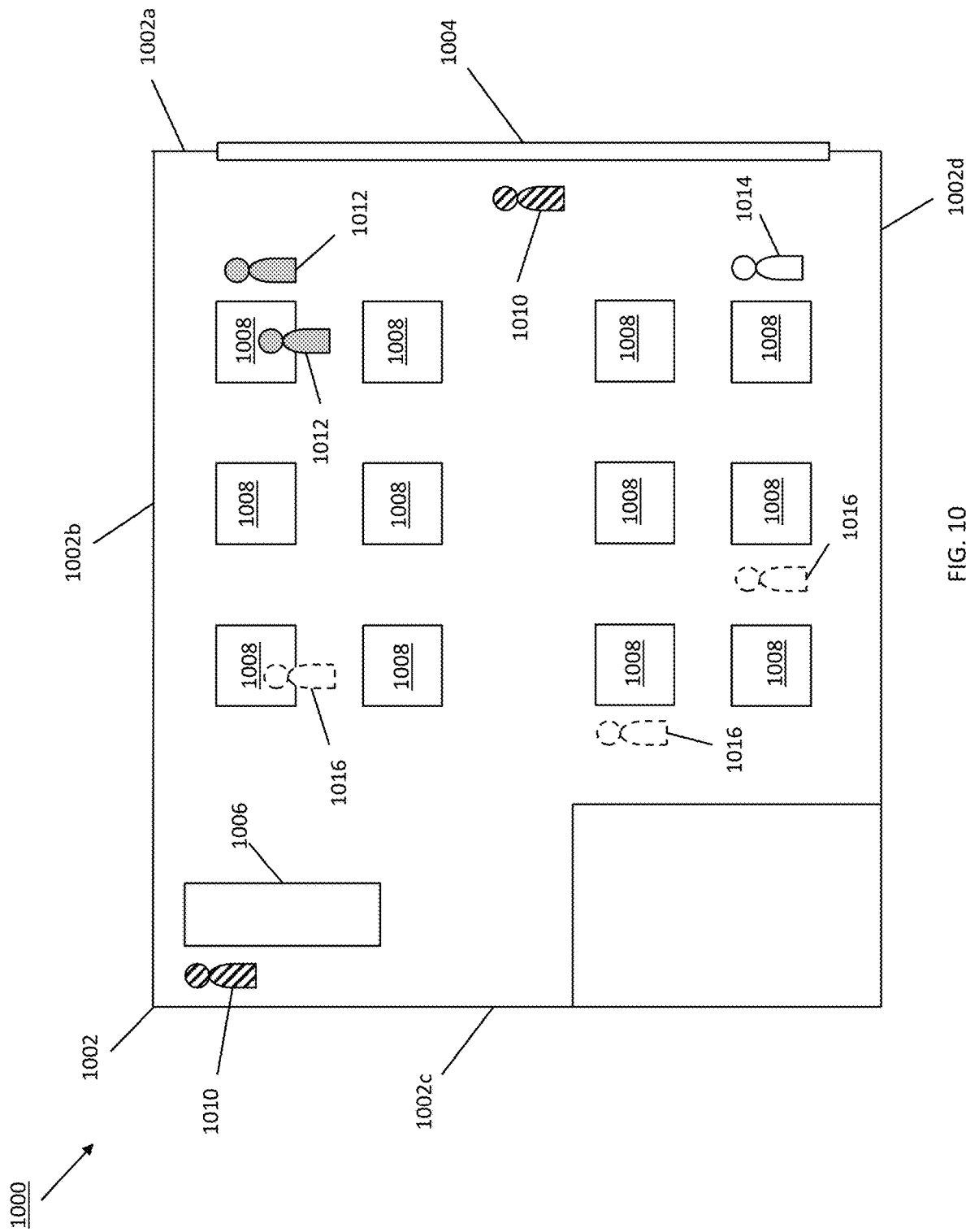
FIG. 10 is a schematic view illustrating an embodiment of an upper level in the merchant physical location of FIG. 7.

Referring now to FIG. 10, an embodiment of a portion of a merchant action recommendation system 1000, is illustrated. The merchant recommendation system 1000 includes an upper level 1002, which may be the upper level 706 discussed above with reference to FIG. 7. The upper level 1002 includes a plurality of exterior walls 1002a, 1002b, 1002c, and 1002d. The exterior wall 1002a includes an exterior window 1004. The upper level 1002 includes a counter 1006 and a plurality of product fixtures 1008.

The merchant action recommendation system 1000 includes a plurality of merchant employees 1010, each of which includes an employee badge or other wearable article within which is incorporated a merchant beacon communication device 600. The merchant action recommendation system 1000 also includes a plurality of physical customers 1012, which may be substantially similar to the customers 500 and 504 discussed above with reference to FIG. 5, and that each include a respective customer beacon communication device. In addition, the merchant action recommendation system 1000 includes known virtual customers 1014, each of which may be substantially similar to the known virtual customers 926 discussed above. Furthermore, the merchant action recommendation system 1000 includes unknown virtual customers 1016.

In an embodiment, the system provider device is configured to monitor merchant virtual locations (e.g., a merchant online store) of the merchant that operates the merchant physical location and detect unknown virtual customers (e.g., customers that are not registered with, not logged into, and/or are otherwise not identifiable through the merchant's online store) viewing and/or purchasing products in the merchant virtual location. Furthermore, the system provider device is also configured to retrieve location information from the merchant beacon communication devices on the products in the upper level 1002 to determine their relative locations within the upper level 1002. The system provider device may then operate to determine an area in the upper level 1002 that includes the product being browsed by the unknown virtual customer 1016 at the merchant virtual location, and provide the representation of the unknown virtual customer 1016 adjacent the physical location in the upper level 1002 that includes the product that that unknown virtual customer is browsing in the merchant virtual location.

For example, the system provider may determine that a unknown customer is viewing a particular jacket at the merchant's online store, and in response may access the merchant physical location account to determine the location of that jacket in the merchant physical location. In response to determining that the jacket being viewed by the unknown virtual customer in the merchant virtual location is located in a particular product fixture 1008, the system provider device may provide the representation of the unknown virtual customer 1016 adjacent that product fixture 1008. Thus, while the employees 1010 and physical customers 1012 of FIG. 10 are actually located in the upper level 1002, the unknown virtual customers 1016 illustrated in FIG. 10 are representations of where the system provider device determines those customers would be based on the product those customers are viewing at the merchant virtual location and the known location of those products in the merchant physical location.

Referring now to FIGS. 11-18, a plurality of different merchant action recommendation screens are illustrated that provide examples of how the information collected by the system provider devices (through the communication of the beacon devices with the customer beacon communication devices and the merchant beacon communication devices) from the inventory level 702/802, the primary level 704/902, and the upper level 706/1002 of the merchant physical location 700 may be analyzed and provided for display to the merchant. In an embodiment, the system provider device operates substantially according to the method 400 discussed above to provide the merchant action recommendations screens discussed below, but with the provision that, at block 402, the location information is collected from the merchant beacon communication devices as well as the customer beacon communication devices. Similarly as discussed above, a variety of other sensor information may be collected similarly as described with the location information, and used in the analysis discussed herein to provide a variety of different types of recommendations.

With each of the merchant action recommendation screens, the merchant may use a merchant device to request the merchant action recommendation screens from the system provider device. Upon verifying the merchant account or merchant physical location account associated with the merchant device, the system provider device may retrieve any information collected (e.g., according to the method 400) and associated with the merchant account, analyze that information to determine merchant action recommendations (or retrieve previously determined merchant action recommendations), and provide the merchant action recommendations in the merchant action recommendation screens over the network to a display device on the merchant device.

Figure 11:
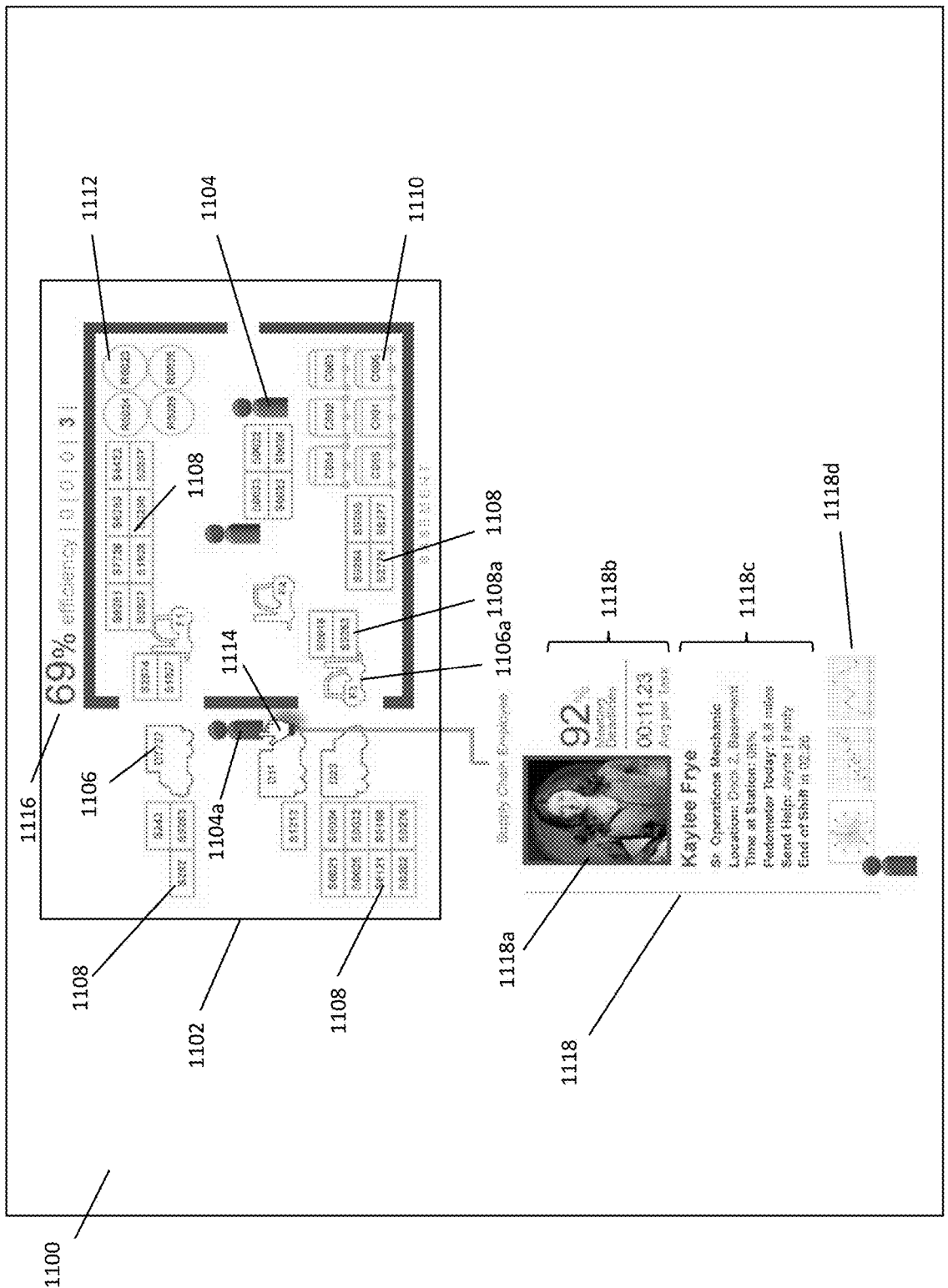
FIG. 11 is a screen shot view illustrating an embodiment of a merchant action recommendation screen for the inventory level of FIG. 8 displayed on a merchant device.

Referring first to FIG. 11, a merchant action recommendation screen 1100 is illustrated that includes information retrieved from merchant beacon communication devices in an inventory level of a merchant physical location (e.g., the inventory level 702/802 of the merchant physical location 700). FIG. 11 illustrates how a merchant may be provided information, analysis, and recommendations about merchant employees at the merchant physical location 700. The merchant recommendation screen 1100 includes an inventory level map 1102 that provides merchant asset representations of each merchant asset to which a merchant beacon communication device 600 is attached. In the illustrated embodiment, the inventory level map 1102 includes employee representations 1104, merchant associated vehicle representations 1106, product representations 1108, container representations 1110, and product rack/holder representations 1112. Using the location information collected from the merchant beacon communication device on each of the merchant assets, the relative position of each of those merchant assets in and around the inventory level 702/802 may be reflected by its respective merchant asset representation on the inventory level map 1102. As such, when merchant assets move (e.g., a merchant associated vehicle moving products), the merchant associate vehicle representation 1106a may move along with the product representation 1108a in real-time or near-real-time.

The inventory level map 1102 also includes an inventory level status bar 1116 that includes information collected from the inventory level 702/802. For example, the illustrated inventory level status bar 1116 includes a customer/employee detection status that reports the number of customer types and employees detected in the format: physical customers|known online customers|unknown online customers|employees, or "0|0|0|3" in the illustrated embodiment, and analysis provided from the information collected from the inventory level 702/802 (e.g., a current efficiency of "69%" in the illustrated embodiment, which may be based on algorithms that reflect the use of employees, work performed, and/or other criteria measurable using the information collected from the inventory level 702/802.)

The merchant action recommendation screen 1100 illustrated in FIG. 11 is also illustrating how a merchant may retrieve analysis and recommendations for any merchant asset represented by a merchant asset representation on the inventory level map 1102. In the illustrated embodiment, the merchant (or merchant employee) has selected the employee representation 1104a (illustrated by the cursor element 1114 "hovering" over the employee representation 1104a) and, in response, an employee information box 1118 is displayed. In an embodiment, the selection of the employee representation 1104a by the merchant sends a request from the merchant device to the system provider device to retrieve information, analysis, and or recommendations collected from the merchant beacon communication devices on the inventory level 702/802 and/or elsewhere in or around the merchant physical location 700, information associated with the employee, and/or other relevant information, and displays that information, analysis, and/or recommendations in the employee information box 1118.

The illustrated embodiment of the employee information box 1118 includes an image 1118a of the employee and a plurality of employee report sections 1118b, 1118c, and 1118d that include information that has been collected from the inventory level 702/802 and/or in and around the merchant physical location 700, analyzed, and/or used to provide merchant action recommendations. For example, the employee report section 1118b reports the percentage of deadlines the employee is meeting and the average amount of time the employee is taking per task. The employee report section 1118c reports the employee's name, title, current location on the inventory level 702/802, percent of time the employee has been located at their designated work station, the distance the employee has walked for the day, a recommendation to send particular employees to help the employee, and a time that the employees shift end. In one example, the percent of time the employee has been located at their designated work station and the distance the employee has walked for the day may be analyzed by the system provider device and determined to be outside of the norm (e.g., the employee may have only been at their designated work station 8% of the day and the employee may have walked over 7 miles that day), and that portion of the report may be highlighted for the merchant. Furthermore, the recommendation to send particular employees to help the employee may be based at least partly upon that determination as well. The employee report section 1118d also includes a plurality of chart links that allow the merchant to view other information, analysis, and/or recommendations that are related to the employee and that may be available from the system provider device.

Figure 12:
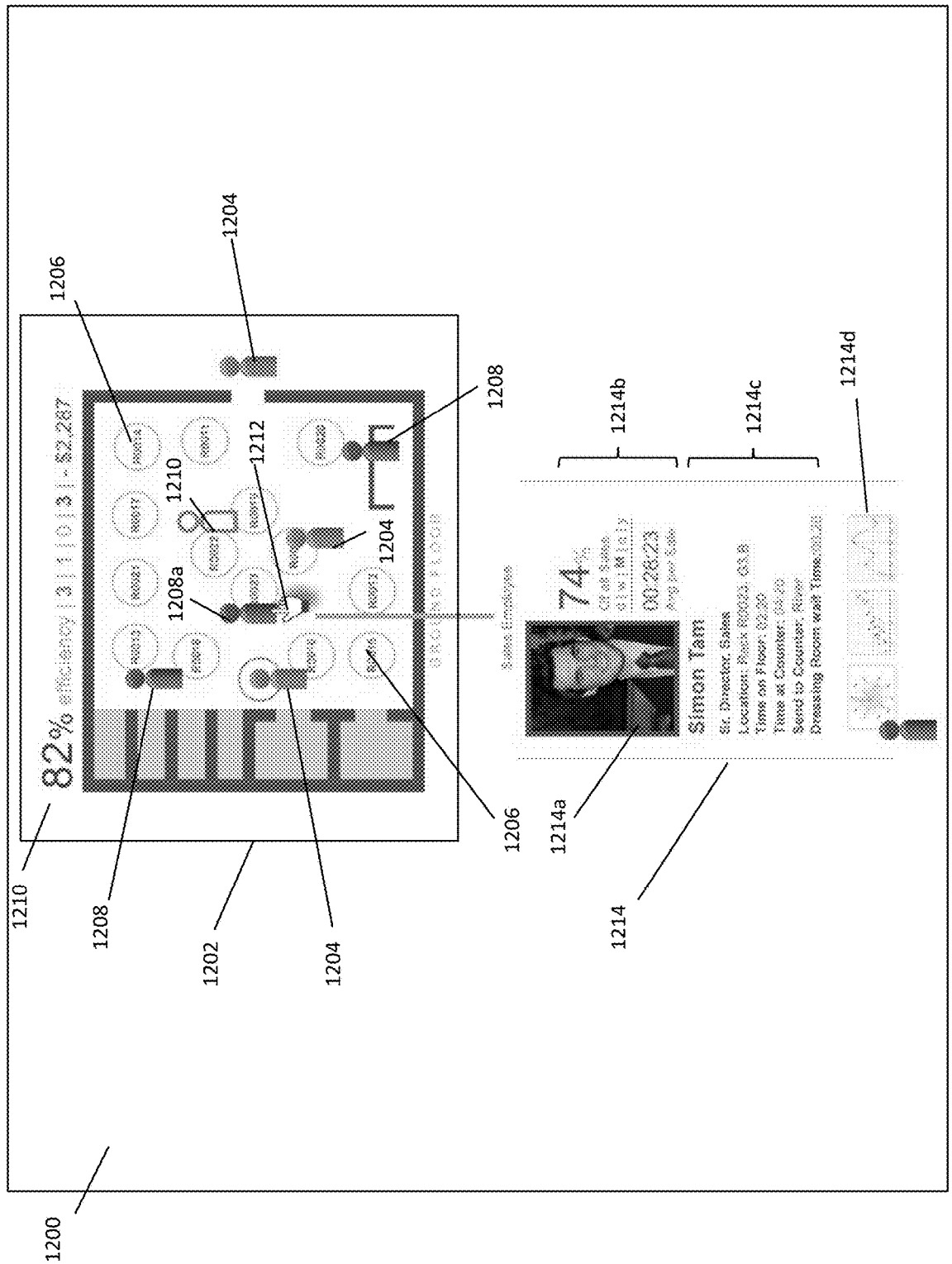
FIG. 12 is a screen shot view illustrating an embodiment of a merchant action recommendation screen for the primary level of FIG. 9 displayed on a merchant device.

Referring now to FIG. 12, a merchant action recommendation screen 1200 is illustrated that includes information retrieved from merchant beacon communication devices and customer beacon communication devices in a primary level of a merchant physical location (e.g., the primary level 707/902 of the merchant physical location 700). FIG. 12 illustrates how a merchant may be provided information, analysis, and recommendations about merchant employees at the merchant physical location 700. The merchant recommendation screen 1200 includes a primary level map 1202 that includes merchant asset representations of each merchant asset to which a merchant beacon communication device 600 is attached, as well as customer representations of each customer having a customer beacon communication device communicating with the merchant action recommendation system. In the illustrated embodiment, the primary level map 1202 includes employee representations 1204, product rack/holder representations 1206, physical customer representations 1208, and known virtual customer representations 1210. Using the location information collected from the merchant beacon communication device on each of the merchant assets, location information collected from the customer beacon communication device on each of the customers, and online viewing information collected from known virtual customers using an online store of the merchant, the relative position of each of the merchant assets and the customers in and around the primary level 704/902 may be reflected by the respective merchant asset representations and customer representations on the primary level map 1202. As such, when merchant assets and customers move (and known virtual customers view different items at the merchant online store), the merchant employee representations 1208, customer representations 1210, and known virtual customer representations 1210 may move in real-time or near-real-time.

The primary level map 1202 also includes a primary level status bar 1210 that includes information collected from the primary level 704/902. For example, the illustrated inventory level status bar 1116 includes a customer/employee detection status that reports the number of customer types and employees detected in the format: physical customers known virtual customers|unknown virtual customers|employees, or "3|1|0|3" in the illustrated embodiment, and analysis provided from the information collected from the primary level 704/902 (e.g., a current efficiency of "82%" in the illustrated embodiment, which may be based on algorithms that reflect the use of employees, work performed, and/or other criteria measurable using the information collected from the inventory level 702/802, as well as a revenue result (e.g., "−$2,287") that is based on how the current efficiency compares to the target efficiency)

The merchant action recommendation screen 1200 illustrated in FIG. 12 is also illustrating how a merchant may retrieve analysis and recommendations for any merchant asset represented by a merchant asset representation on the primary level map 1202. In the illustrated embodiment, the merchant (or merchant employee) has selected the employee representation 1208a (illustrated by the cursor element 1212 "hovering" over the employee representation 1208a) and, in response, an employee information box 1214 is displayed. In an embodiment, the selection of the employee representation 1208a by the merchant sends a request from the merchant device to the system provider device to retrieve information, analysis, and or recommendations collected from the merchant beacon communication devices on the primary level 704/902 and/or elsewhere in or around the merchant physical location 700, information associated with the employee, and/or other relevant information, and displays that information, analysis, and/or recommendations in the employee information box 1214.

The illustrated embodiment of the employee information box 1214 includes an image 1214a of the employee and a plurality of employee report sections 1214b, 1214c, and 1214d that include information that has been collected from the primary level 704/902 and/or in and around the merchant physical location 700, analyzed, and/or used to provide merchant action recommendations. For example, the employee report section 1214b reports the percentage of sales that the employee is responsible for and the average amount of each sale by the employee (which may be determined by time periods such as day, week, month, quarter, and year). The employee report section 1214*c* reports the employee's name, title, current location on the primary level 704/902, an amount of time the employee has been on the floor, an amount of time the employee has been behind the counter, a recommendation to send a particular employee to the counter, and a current dressing room wait time on the primary level 704/902. In one example, the amount of time the employee has been located behind the counter may exceed the amount of time that the employee has been on the floor, and that portion of the report may be highlighted for the merchant (particularly when the employee is determined to be responsible for a high amount of sales). Similarly, a high current dressing room wait time may be highlighted for the merchant. Furthermore, the recommendation to send a particular employee to the counter may be based at least partly upon those determinations. The employee report section 1214*d* also includes a plurality of chart links that allow the merchant to view other information, analysis, and/or recommendations related to that employee and that may be available from the system provider device.

Figure 13:
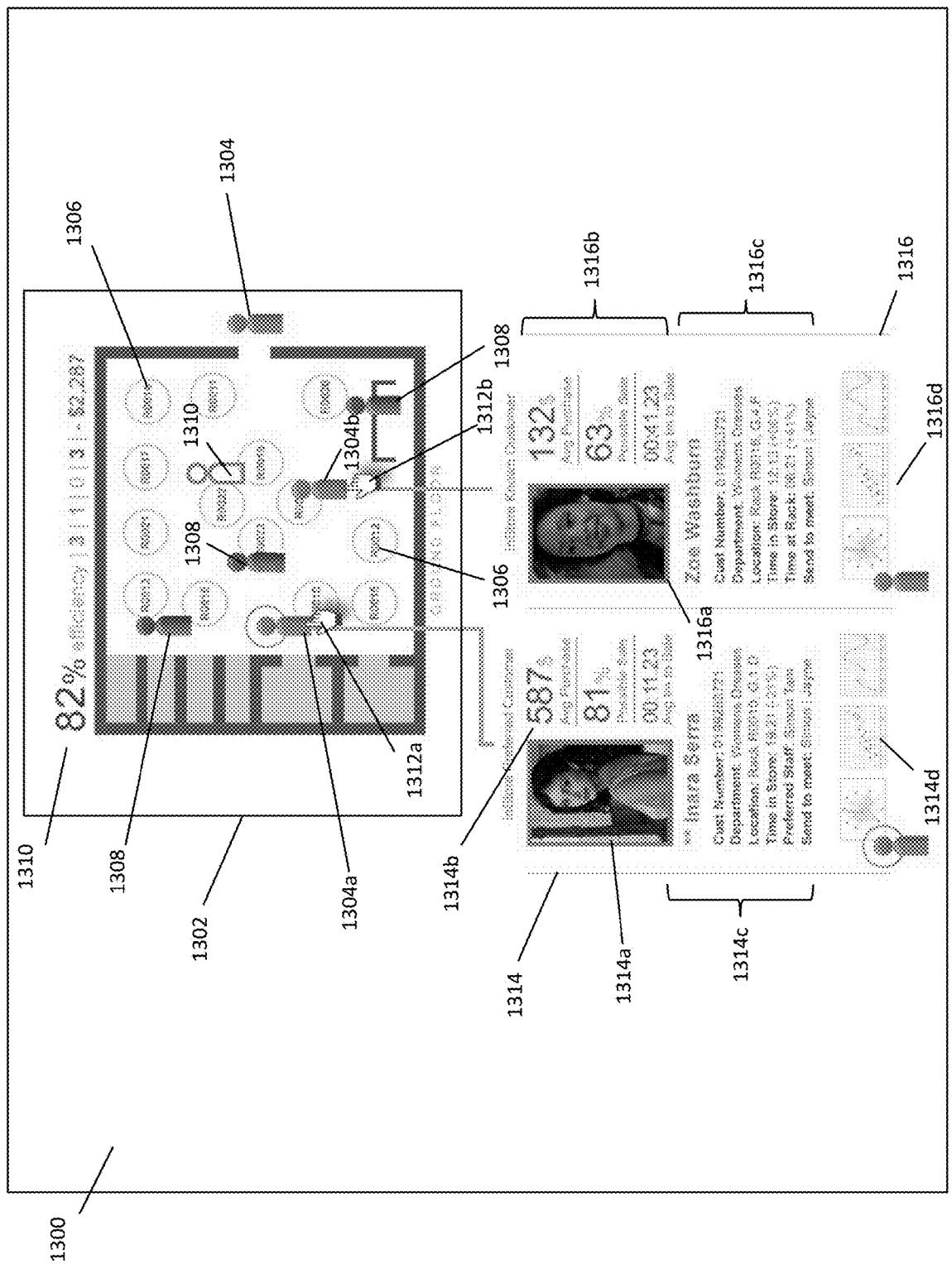
FIG. 13 is a screen shot view illustrating an embodiment of a merchant action recommendation screen for the upper level of FIG. 10 displayed on a merchant device.

Referring now to FIG. 13, a merchant action recommendation screen 1300 is illustrated that includes information retrieved from merchant beacon communication devices and customer beacon communication devices in a primary level of a merchant physical location (e.g., the primary level 704/902 of the merchant physical location 700). FIG. 13 illustrates how a merchant may be provided information, analysis, and recommendations about customers at the merchant physical location 700. The merchant recommendation screen 1300 includes a primary level map 1302 that includes merchant asset representations of each merchant asset to which a merchant beacon communication device 600 is attached, as well as customer representations of each customer having a customer beacon communication device communication with the merchant action recommendation system. In the illustrated embodiment, the primary level map 1302 includes employee representations 1304, product rack/holder representations 1306, physical customer representations 1308, and known virtual customer representations 1310. Using the location information collected from the merchant beacon communication device on each of the merchant assets, location information collected from the customer beacon communication device on each of the customers, and online viewing information collected from known customers using an online store of the merchant, the relative position of each of the merchant assets and the customers in and around the primary level 704/902 may be reflected by the respective merchant asset representations and customer representations on the primary level map 1302. As such, when merchant assets and customers move (and known virtual customers view different items at the merchant online store), the merchant employee representations 1308, customer representations 1310, and known virtual customer representations 1310 may move in real-time or near-real-time.

The primary level map 1302 also includes a primary level status bar 1310 that includes information collected from the primary level 704/902. For example, the illustrated primary level status bar 1310 includes a customer/employee detection status that reports the number of customer types and employees detected in the format: physical customers known online customers|unknown online customers|employees, or "3|1|0|3" in the illustrated embodiment, and analysis provided from the information collected from the primary level 704/902 (e.g., an efficiency of "82%" in the illustrated embodiment, which may be based on algorithms that reflect the use of employees, work performed, and/or other criteria measurable using the information collected from the inventory level 702/802, as well as a revenue result (e.g., "−$2,287") based on the target efficiency)

The merchant action recommendation screen 1300 illustrated in FIG. 13 is also illustrating how a merchant may retrieve analysis and recommendations for any customer representation on the primary level map 1302. In the illustrated embodiment, the merchant (or merchant employee) has selected the customer representation 1304*a* (illustrated by the cursor element 1312*a* "hovering" over the customer representation 1304*a*) and has selected the customer representation 1304*b* (illustrated by the cursor element 1312*b* "hovering" over the customer representation 1304*b*) and, in response, customer information boxes 1314 and 1316 are displayed. In an embodiment, the selection of the customer representations 1304*a* and 1304*b* by the merchant sends a request from the merchant device to the system provider device to retrieve information, analysis, and or recommendations collected from the customer beacon communication devices on the primary level 704/902 and/or elsewhere in or around the merchant physical location 700, information associated with the customers, and/or other relevant information, and displays that information, analysis, and/or recommendations in the customer information boxes 1314 and 1316.

The illustrated embodiment, the customer information boxes 1314 and 1316 include images 1314*a* and 1316*a*, respectively, of the customers, along with a plurality of customer report sections 1314*b*, 1314*c*, and 1314*d*; and 1316*a*, 1316*b*, and 1316*d*; respectively, that include information that has been collected from the primary level 704/902 and/or in and around the merchant physical location 700, analyzed, and/or used to provide merchant action recommendations. For example, the customer report sections 1314*b* and 1316*b* report the average purchase amounts by each of the customers, a percentage of making a possible sale to each of the customers, and average time it has taken to make a sale to each of the customers. The customer report sections 1314*c* and 1316*c* report the customer's names, customer identification numbers, the customers current location on the primary level 704/902 (e.g., by department and product rack), the amount of time the customers have been in the store, a time the customers have spent at a particular product rack, a preferred staff member for the customers, and a recommendation to send a particular employee to meet the customers. In one example, the amount of time a customer has been in the store may exceed a maximum time, and that amount of time may be highlighted for the merchant. Similarly, an amount of time a customer has been at a product rack may exceed a maximum time, and that amount of time may be highlighted for the merchant. Furthermore, the recommendation to send particular employees to the customers may be based at least partly upon those factors. The employee report sections 1314*d* and 1316 also include a plurality of chart links that allow the merchant to view other information, analysis, and/or recommendations about the customers that may be available from the system provider device.

Figure 14:
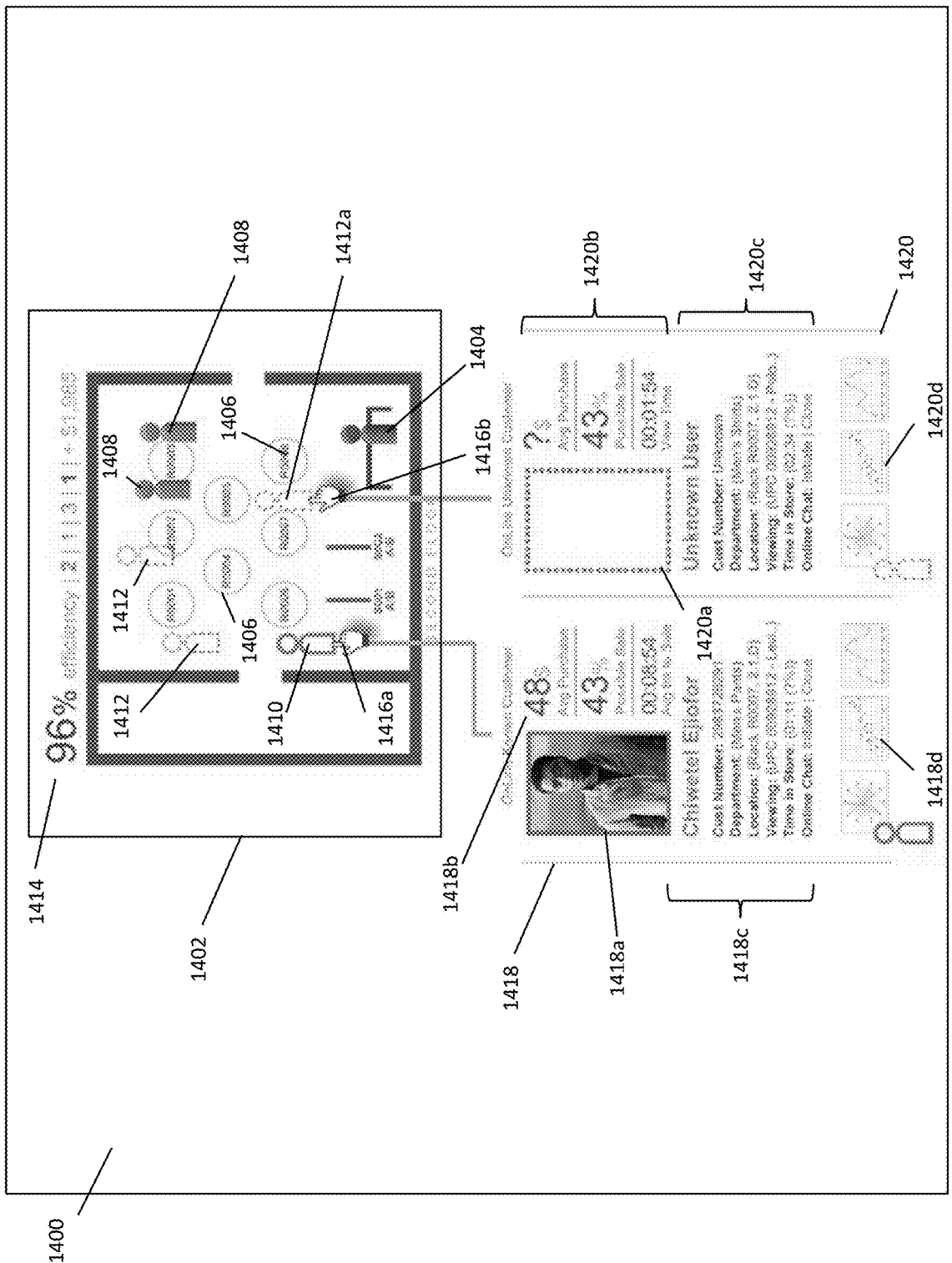
FIG. 14 is a screen shot view illustrating an embodiment of a merchant action recommendation screen for the primary level of FIG. 9 displayed on a merchant device.

Referring now to FIG. 14, a merchant action recommendation screen 1400 is illustrated that includes information retrieved from merchant beacon communication devices and customer beacon communication devices in an upper level of a merchant physical location (e.g., the primary level 706/1002 of the merchant physical location 700). FIG. 14 illustrates how a merchant may be provided information, analysis, and recommendations about virtual customers at a merchant virtual location and have that information related to the merchant physical location 700. The merchant recommendation screen 1400 includes an upper level map 1402 that includes merchant asset representations of each merchant asset to which a merchant beacon communication device 600 is attached, as well as customer representations of each customer having a customer beacon communication device communicating with the merchant action recommendation system. In the illustrated embodiment, the upper level map 1402 includes employee representations 1404, product rack/holder representations 1406, physical customer representations 1408, known virtual customer representations 1410, and unknown virtual customer representations 1412. Using the location information collected from the merchant beacon communication device on each of the merchant assets, location information collected from the customer beacon communication device on each of the customers, and online viewing information collected from known virtual customers and unknown virtual customers using an online store of the merchant, the relative position of each of the merchant assets and the customers in and around the upper level 706/1002 may be reflected by the respective merchant asset representations and customer representations on the upper level map 1402. As such, when merchant assets and customers move (and known virtual customers or unknown virtual customers view different items at the merchant online store), the employee representations 1404, product rack/holder representations 1406, physical customer representations 1408, known virtual customer representations 1410, and unknown virtual customer representations 1412 may move in real-time or near-real-time.

The upper level map 1402 also includes an upper level status bar 1414 that includes information collected from the upper level 706/1002. For example, the illustrated upper level status bar 1414 includes a customer/employee detection status that reports the number of customer types and employees detected in the format: physical customers known online customers|unknown online customers|employees, or "2|1|3|1" in the illustrated embodiment), and analysis provided from the information collected from the upper level 706/1002 (e.g., an efficiency of "96%" in the illustrated embodiment, which may be based on algorithms that reflect the use of employees, work performed, and/or other criteria measurable using the information collected from the upper level 706/1002, as well as a revenue result (e.g., "+$2,287") based on a target efficiency)

The merchant action recommendation screen 1400 illustrated in FIG. 14 is also illustrating how a merchant may retrieve analysis and recommendations for any customer representation on the upper level map 1402. In the illustrated embodiment, the merchant (or merchant employee) has selected the known virtual customer representation 1410 (illustrated by the cursor element 1416a "hovering" over the known virtual customer representation 1410) and has selected the unknown virtual customer representation 1412a (illustrated by the cursor element 1416b "hovering" over the unknown virtual customer representation 1412a) and, in response, a known virtual customer information box 1418 and an unknown virtual customer information box 1420 are displayed. In an embodiment, the selection of the known virtual customer representation 1410 and the unknown virtual customer representation 1412a by the merchant sends a request from the merchant device to the system provider device to retrieve information, analysis, and or recommendations collected on the upper level 706/1002 and/or elsewhere in or around the merchant physical location 700, information associated with the virtual customers, and/or other relevant information, and displays that information, analysis, and/or recommendations in the known virtual customer information box 1418 and unknown virtual customer information box 1420.

The illustrated embodiment of the known virtual customer information box 1418 and unknown virtual customer information box 1420 includes an image 1418a and a lack of an image 1420a (for the unknown virtual customer), respectively, and a plurality of customer report sections 1418b, 1418c, and 1418d; and 1420a, 1420b, and 1420d; respectively, that include information that has been collected from the upper level 706/1002, in and around the merchant physical location 700, and from the merchant virtual location, analyzed, and/or used to provide merchant action recommendations. For example, the customer report sections 1418b and 1420b report the average purchase amount for the known virtual customer and an unknown average purchase amount for the unknown virtual customer, and a possibility of making a sale to the known and unknown virtual customers. The customer report sections 1418c and 1420c report the customer's names (if available), customer identification numbers (if available), each customers virtual current location on the upper level 706/1002 (e.g., by department and product rack), products that each of the known and unknown virtual customers are currently looking at, an amount of time each customer has been in the merchant online store, and an option to initiate a chat with the known and unknown online virtual customers. The employee report sections 1314d and 1316 also include a plurality of chart links that allow the merchant to view other information, analysis, and/or recommendations about the known and/or unknown virtual customers that may be available from the system provider device.

Figure 15:
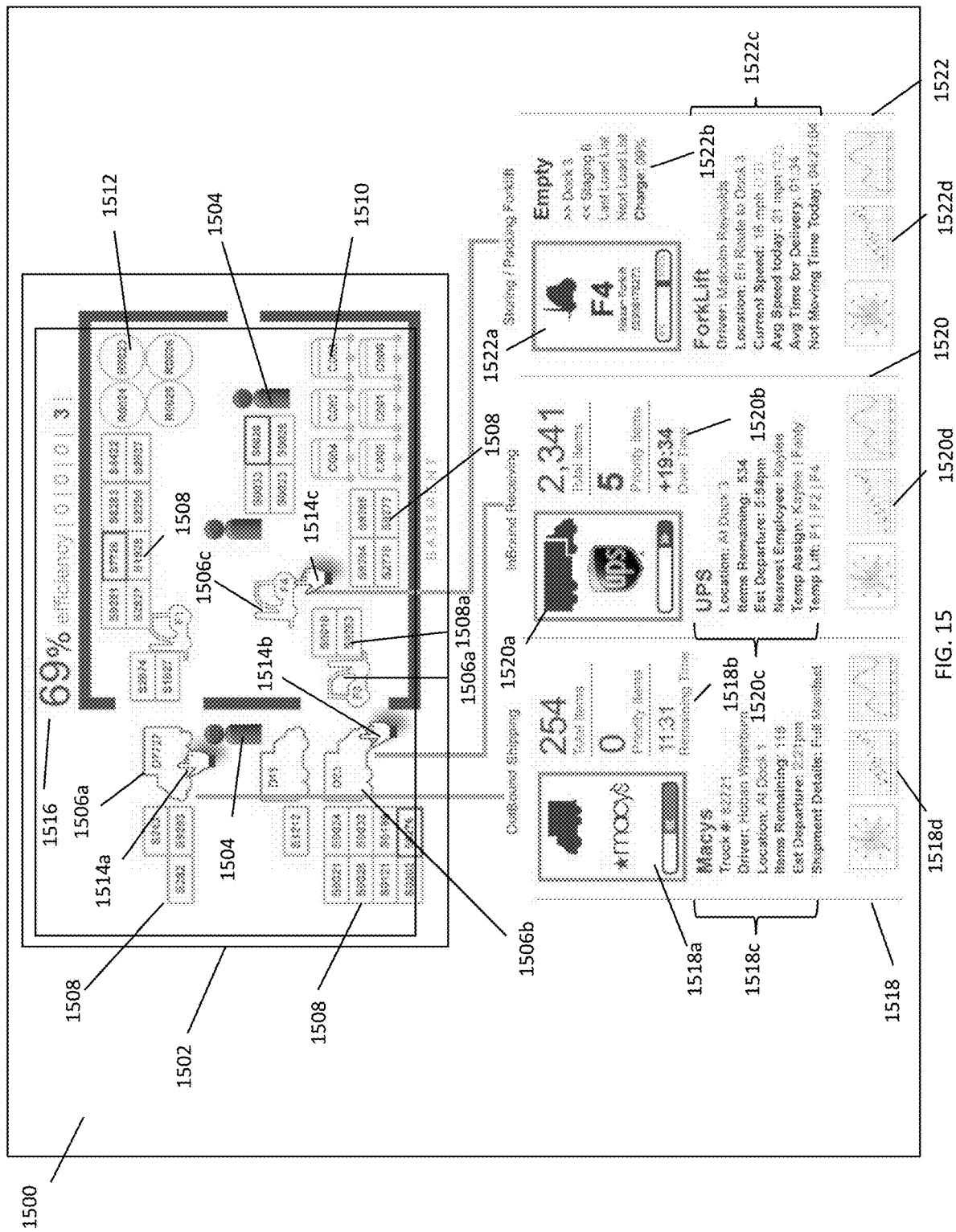
FIG. 15 is a screen shot view illustrating an embodiment of a merchant action recommendation screen for the inventory level of FIG. 8 displayed on a merchant device.

Referring now to FIG. 15, a merchant action recommendation screen 1500 is illustrated that includes information retrieved from merchant beacon communication devices in an inventory level of a merchant physical location (e.g., the inventory level 702/802 of the merchant physical location 700). FIG. 15 illustrates how a merchant may be provided information, analysis, and recommendations about merchant associated vehicles in the merchant physical location 700. The merchant recommendation screen 1500 includes an inventory level map 1502 that includes merchant asset representations of each merchant asset to which a merchant beacon communication device 600 is attached. In the illustrated embodiment, the inventory level map 1502 includes employee representations 1504, merchant associated vehicle representations 1506, product representations 1508, container representations 1510, and product rack/holder representations 1512. Using the location information collected from the merchant beacon communication device on each of the merchant assets, the relative position of each of those merchant assets in and around the inventory level 702/802 may be reflected by its respective merchant asset representation on the inventory level map 1502. As such, when merchant assets move (e.g., a merchant associated vehicle moving products), the merchant associate vehicle representation 1506a may move along with the product representation 1508a in real-time or near-real-time.

The inventory level map 1502 also includes an inventory level status bar 1516 that includes information collected from the inventory level 702/802. For example, the illustrated inventory level status bar 1516 includes a customer/employee detection status that reports the number of customer types and employees detected in the format: physical customers known online customers|unknown online customers|employees, or "0|0|0|3" in the illustrated embodiment, and analysis provided from the information collected from the inventory level 702/802 (e.g., an efficiency of "69%" in the illustrated embodiment, which may be based on algorithms that reflect the use of employees, work performed, and/or other criteria measurable using the information collected from the inventory level 702/802.)

The merchant action recommendation screen 1500 illustrated in FIG. 15 is also illustrating how a merchant may retrieve analysis and recommendations for any merchant asset represented by a merchant asset representation on the inventory level map 1502. In the illustrated embodiment, the merchant (or merchant employee) has selected the merchant associated vehicle representations 1506a, 1506b, and 1506c (illustrated by the cursor elements 1514a, 1514b, and 1514c "hovering" over the respective merchant associated vehicle representations 1506a, 1506b, and 1506c) and, in response, merchant associated vehicle information boxes 1518, 1520, and 1522 are displayed. In an embodiment, the selection of the merchant associated vehicle representations 1506a, 1506b, and 1506c by the merchant sends a request from the merchant device to the system provider device to retrieve information, analysis, and or recommendations collected from the merchant beacon communication devices on the inventory level 702/802 and/or elsewhere in or around the merchant physical location 700, information associated with the merchant associated vehicles, and/or other relevant information, and displays that information, analysis, and/or recommendations in the merchant associated vehicle information boxes 1518, 1520, and 1522.

The illustrated embodiment of the merchant associated vehicle information boxes 1518, 1520, and 1522 each include an image 1518a, 1520a, and 1522a for the merchant associated vehicles and a plurality of merchant associated vehicle report sections 1518b, 1518c, and 1518d; 1520a, 1520b, and 1520c; and 1522a, 1522b, and 1522c, respectively, that include information that has been collected from the inventory level 702/802 and/or in and around the merchant physical location 700, analyzed, and/or used to provide merchant action recommendations. For example, the merchant associated vehicle report section 1518b reports a total number of items outbound on the merchant associated vehicle, a number of priority items on the merchant associated vehicle, and an amount of time remaining for the inventory transfer to the merchant associated vehicle to complete; the merchant associated vehicle report section 1520b reports a total number of items inbound on the merchant associated vehicle, a number of priority items on the merchant associated vehicle, and an amount of time over the expected time to complete the inventory transfer from the merchant associated vehicle; and the merchant associated vehicle report section 1522b reports that the merchant associated vehicle 1506c is empty, heading to a particular area in the inventory level 702/802, leaving a particular area in the inventory level 702/802, and a level of charge for the merchant associated vehicle.

Furthermore, the merchant associated vehicle report section 1520c reports a vehicle operator for the merchant associated vehicle, a vehicle number for the merchant associated vehicle, a driver name for the merchant associated vehicle, a current location of the merchant associated vehicle, a number of items remaining on the merchant associated vehicle, an estimated departure time for the merchant associated vehicle, and a link to shipment details for the inventory transfer associated with the merchant associated vehicle; the merchant associated vehicle report section 1520c reports a vehicle operator for the merchant associated vehicle, a current location of the merchant associated vehicle, a number of items remaining in the merchant associated vehicle, an estimated departure time for the merchant associated vehicle, an employee in the inventory level 702/802 that is nearest to the merchant associated vehicle, a recommendation to temporarily assign a particularly employee to the merchant associated vehicle, and other vehicles (e.g., forklift vehicles) to temporarily assign to the merchant associated vehicle; and the merchant associated vehicle report section 1522c reports the type of the merchant associated vehicle, the driver of the merchant associated vehicle, the current location of the merchant associated vehicle, a current speed of the merchant associated vehicle, an average speed for the day of the merchant associated vehicle, an average time for deliveries by the merchant associated vehicle, and a cumulative time the merchant associated vehicle has not moved for the day.

In one example, the items remaining on a merchant associated vehicle and the estimated departure time of a merchant associated vehicle may exceed maximums in the merchant associated vehicle report section 1520c, and those portions of the report may be highlights for the merchant. Similarly, the current speed of the merchant associated vehicle, average speed of the merchant associated vehicle, and cumulative time the merchant associated vehicle has not moved may exceed maximums in the merchant associated vehicle report section 1522c, and those portions of the report may be highlights for the merchant. Furthermore, the recommendation to assign particular employees to the merchant associated vehicle in the merchant associated vehicle report section 1520c may be based at least partly upon the information that that employee is nearest to the vehicle. The employee report sections 1518d, 1520d, and 1522d also includes a plurality of chart links that allow the merchant to view other information, analysis, and/or recommendations related to the merchant associated vehicles that may be available from the system provider device.

Figure 16:
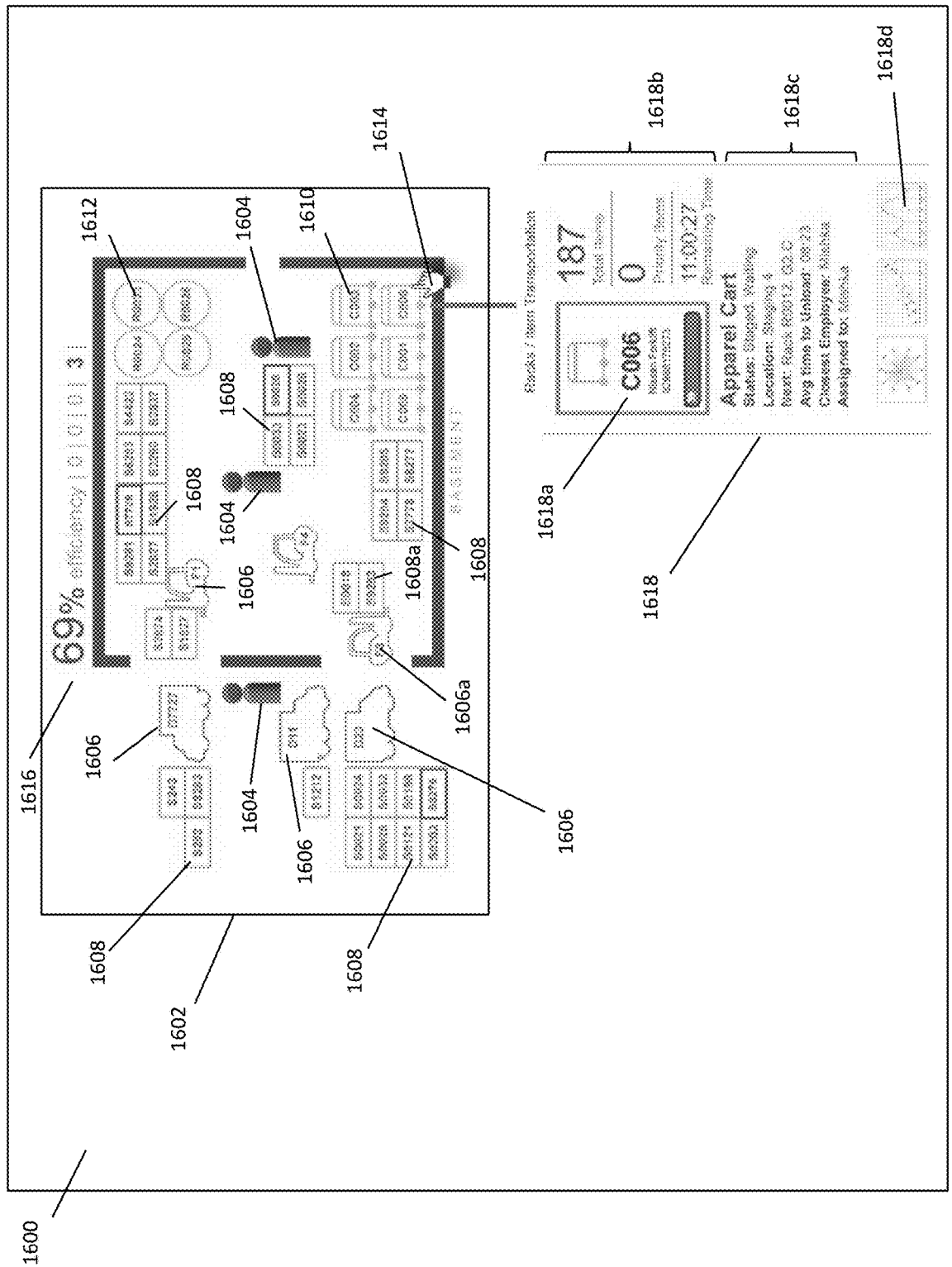
FIG. 16 is a screen shot view illustrating an embodiment of a merchant action recommendation screen for the inventory level of FIG. 8 displayed on a merchant device.

Referring now to FIG. 16, a merchant action recommendation screen 1600 is illustrated that includes information retrieved from merchant beacon communication devices in an inventory level of a merchant physical location (e.g., the inventory level 702/802 of the merchant physical location 700). FIG. 16 illustrates how a merchant may be provided information, analysis, and recommendations about containers in the merchant physical location 700. The merchant recommendation screen 1600 includes an inventory level map 1602 that includes merchant asset representations of each merchant asset to which a merchant beacon communication device 600 is attached. In the illustrated embodiment, the inventory level map 1602 includes employee representations 1604, merchant associated vehicle representations 1606, product representations 1608, container representations 1610, and product rack/holder representations 1612. Using the location information collected from the merchant beacon communication device on each of the merchant assets, the relative position of each of those merchant assets in and around the inventory level 702/802 may be reflected by its respective merchant asset representation on the inventory level map 1602. As such, when merchant assets move (e.g., a merchant associated vehicle moving products), the merchant associate vehicle representation 1606a may move along with the product representation 1608a in real-time or near-real-time.

The inventory level map 1602 also includes an inventory level status bar 1616 that includes information collected from the inventory level 702/802. For example, the illustrated inventory level status bar 1616 includes a customer/employee detection status that reports the number of customer types and employees detected in the format: physical customers known online customers|unknown online customers|employees, or "0|0|0|3" in the illustrated embodiment, and analysis provided from the information collected from the inventory level 702/802 (e.g., an efficiency of "69%" in the illustrated embodiment, which may be based on algorithms that reflect the use of employees, work performed, and/or other criteria measurable using the information collected from the inventory level 702/802.)

The merchant action recommendation screen 1600 illustrated in FIG. 16 is also illustrating how a merchant may retrieve analysis and recommendations for any merchant asset represented by a merchant asset representation on the inventory level map 1602. In the illustrated embodiment, the merchant (or merchant employee) has selected a container representation 1610 (illustrated by the cursor element 1614 "hovering" over the container representation 1610) and, in response, a container information box 1618 is displayed. In an embodiment, the selection of the container representation 1610 by the merchant sends a request from the merchant device to the system provider device to retrieve information, analysis, and or recommendations collected from the merchant beacon communication devices on the inventory level 702/802 and/or elsewhere in or around the merchant physical location 700, information associated with the containers, and/or other relevant information, and displays that information, analysis, and/or recommendations in the merchant associated container information 1618.

The illustrated embodiment of the container information 1618 includes an image 1618a for container and a plurality of container report sections 1618b, 1618d, and 1618e that include information that has been collected from the inventory level 702/802 and/or in and around the merchant physical location 700, analyzed, and/or used to provide merchant action recommendations. For example, the container report section 1618b reports a total number of items in the container, a number of priority items in the container, and an amount of time that the container will be remain located on the inventory level 702/802. Furthermore, the merchant associated vehicle report section 1618c reports a type of the container (e.g. "Apparel Cart"), a status of the container, a location of the container on the inventory level 702/802, a next area in the merchant physical location for items in the container, an average time it takes to unload the container, an employee on the inventory level 702/802 that is closest to the container, and a recommendation to assign a particular employee to the container. In one example, the recommendation to assign a particular employee to the container may be based at least partly upon the information that that employee is nearest to the container. The employee report section 1618d also includes a plurality of chart links that allow the merchant to view other information, analysis, and/or recommendations related to the container that may be available from the system provider device.

Figure 17:
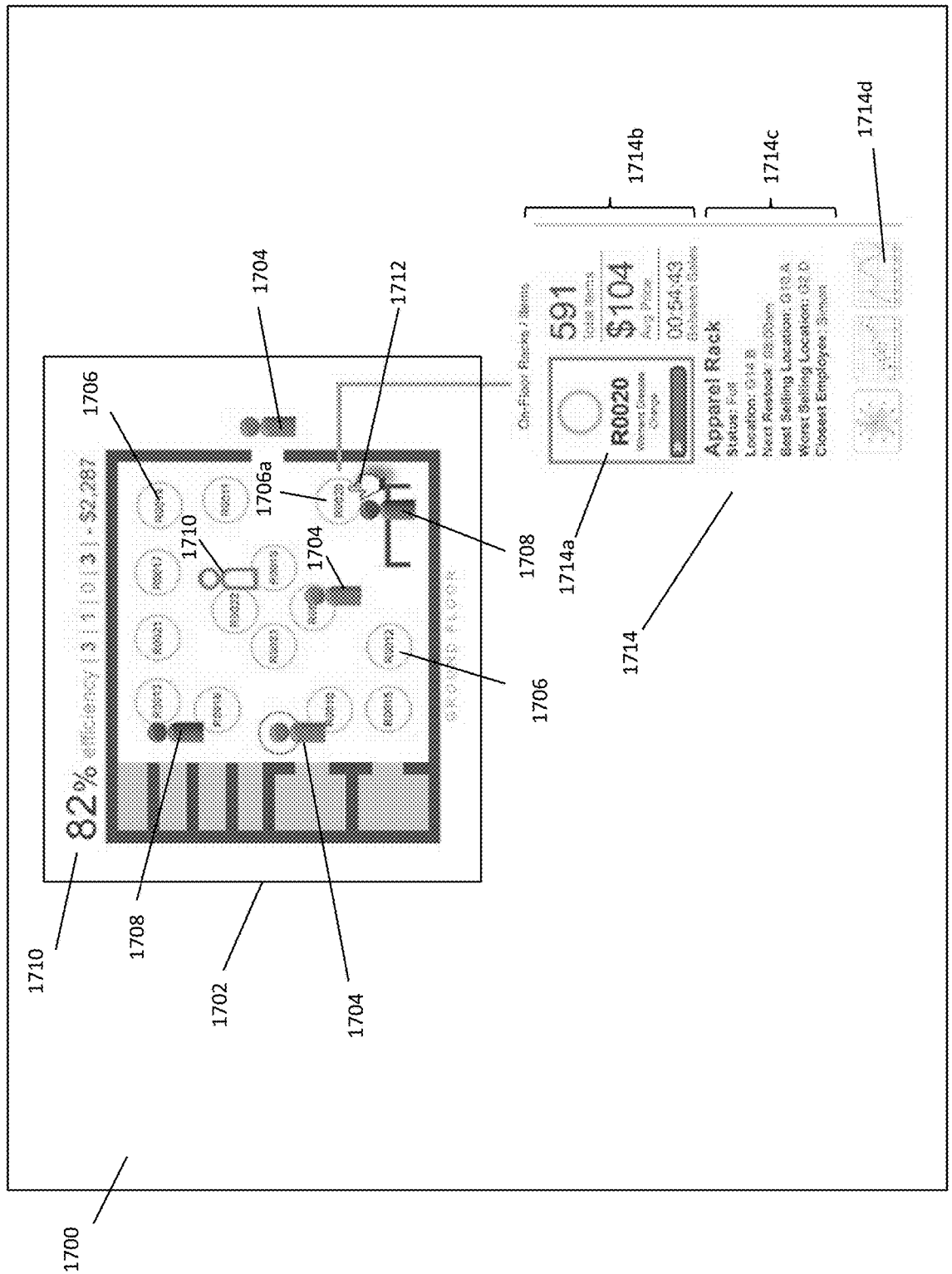
FIG. 17 is a screen shot view illustrating an embodiment of a merchant action recommendation screen for the primary level of FIG. 9 displayed on a merchant device.

Referring now to FIG. 17, a merchant action recommendation screen 1700 is illustrated that includes information retrieved from merchant beacon communication devices and customer beacon communication devices in a primary level of a merchant physical location (e.g., the primary level 704/902 of the merchant physical location 700). FIG. 17 illustrates how a merchant may be provided information, analysis, and recommendations about product racks/holders in the merchant physical location 700. The merchant recommendation screen 1700 includes a primary level map 1702 that includes merchant asset representations of each merchant asset to which a merchant beacon communication device 600 is attached, as well as customer representations of each customer having a customer beacon communication device communication with the merchant action recommendation system. In the illustrated embodiment, the primary level map 1702 includes employee representations 1704, product rack/holder representations 1706, physical customer representations 1708, and known virtual customer representations 1710. Using the location information collected from the merchant beacon communication device on each of the merchant assets, location information collected from the customer beacon communication device on each of the customers, and online viewing information collected from known customers using an online store of the merchant, the relative position of each of the merchant assets and the customers in and around the primary level 704/902 may be reflected by the respective merchant asset representations and customer representations on the primary level map 1702. As such, when merchant assets and customers move (and known virtual customers view different items at the merchant online store), the merchant employee representations 1708, customer representations 1710, and known virtual customer representations 1710 may move in real-time or near-real-time.

The primary level map 1702 also includes a primary level status bar 1710 that includes information collected from the primary level 704/902. For example, the illustrated primary level status bar 1710 include a customer/employee detection status that reports the number of customer types and employees detected in the format physical customers known online customers|unknown online customers|employees, or "3|1|0|3" in the illustrated embodiment, and analysis provided from the information collected from the primary level 704/902 (e.g., an efficiency of "82%" in the illustrated embodiment, which may be based on algorithms that reflect the use of employees, work performed, and/or other criteria measurable using the information collected from the inventory level 702/802, as well as a revenue result (e.g., "−$2, 287") based on a target efficiency)

The merchant action recommendation screen 1700 illustrated in FIG. 17 is also illustrating how a merchant may retrieve analysis and recommendations for any customer representation on the primary level map 1702. In the illustrated embodiment, the merchant (or merchant employee) has selected the product rack/holder representation 1706a (illustrated by the cursor element 1712 "hovering" over the product rack/holder representation 1706a) and, in response, a product rack/holder information box 1714 is displayed. In an embodiment, the selection of the product rack/holder representations 1706a by the merchant sends a request from the merchant device to the system provider device to retrieve information, analysis, and or recommendations collected from the merchant beacon communication devices on the primary level 704/902 and/or elsewhere in or around the merchant physical location 700, information associated with the customers, and/or other relevant information, and displays that information, analysis, and/or recommendations in the product rack/holder information box 1714.

The illustrated embodiment of the product rack/holder information box 1714 includes an image 1714a of the product rack/holder and a plurality of product rack/holder report sections 1714b, 1714c, and 1714d, that include information that has been collected from the primary level 704/902 and/or in and around the merchant physical location 700, analyzed, and/or used to provide merchant action recommendations. For example, the product rack/holder report section 1714*b* report the total number of items on the product rack/holder, the average price of items in the product rack/holder, and the amount of time between sales of products in the product/rack holder. The product rack/holder report section 1714*c* reports the type of product rack/holder (e.g., an "Apparel Rack"), the status of the product rack/holder (e.g., "full" in the illustrated embodiment), the location of the product rack/holder on the primary level 704/902, the area in the merchant location 700 where sales from the product rack/holder are the highest, the area in the merchant location 700 where sales from the product rack/holder are the lowest, and the closest employee to the product rack/holder. The product rack/holder report section 1714*d* include a plurality of chart links that allow the merchant to view other information, analysis, and/or recommendations related to the product rack/holder that may be available from the system provider device.

Figure 18:
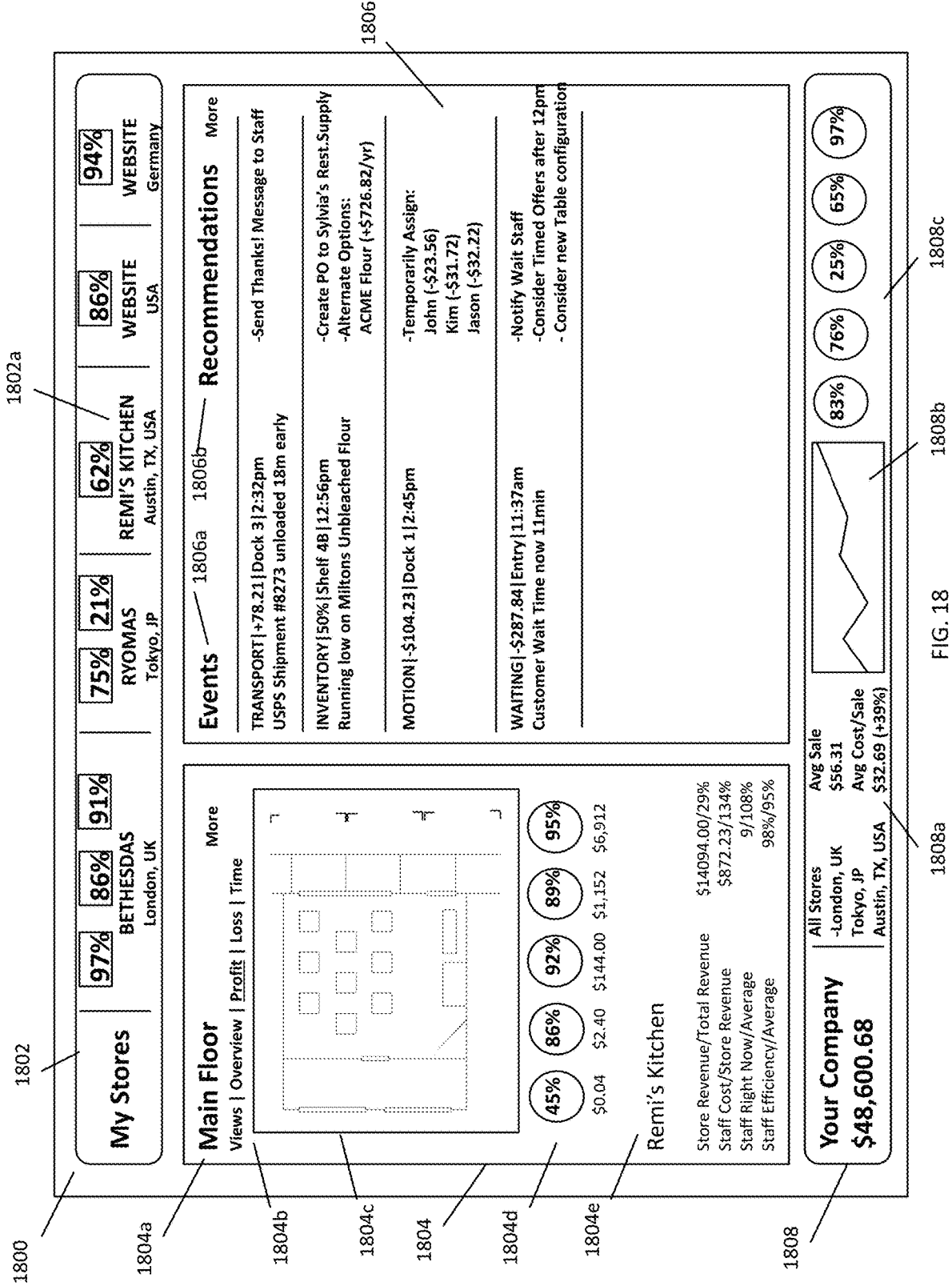
FIG. 18 is a screen shot view illustrating an embodiment of a cumulative merchant action recommendation screen for a plurality of merchant physical locations displayed on a merchant device.

Referring now to FIG. 18, an embodiment of a cumulative merchant action recommendation screen 1800 is illustrated. In some embodiments, the merchant action recommendation systems discussed above may be provided in multiple merchant physical locations that are all associated with the same merchant. In such embodiments, it may be desirable for the merchant to be able to monitor all of those merchant physical locations, receive information collected from each of the merchant action recommendation systems, and be provided recommendations that increase the efficiency of the operation of the merchant physical locations. As such, the cumulative merchant action recommendation screen 1800 may be provided that gives the merchant a "snapshot" of the current operation of their multiple merchant physical locations, and provides information, analysis, and recommendations based on the information received from those merchant physical locations substantially as discussed above.

The cumulative merchant action recommendation screen 1800 includes a "My Stores" bar 1802 that provides a global view of efficiency numbers for a plurality of different merchant physical locations associated with the merchant. In the illustrated embodiment, the merchant may have selected a merchant physical location representation 1802*a* in the "My Stores" bar 1802 to retrieve a merchant physical location summary box 1804. In the illustrated embodiment, the merchant physical location summary box 1804 is displaying information for a Main Floor 1804 of the selected merchant physical location, and allows a user to view different information associated with the Main Floor 1804 by selecting an information type in an information selector menu 1804*b* (e.g., "views", "overview", "profit", "loss", and "time"). The merchant physical location summary box 1804 also includes a main floor map 1804*c* that illustrates the main floor of the selected merchant physical location.

In response to the merchant selecting a "profit" information type on the information selector menu, the merchant physical location summary box 1804 may include a profit efficiency section 1804*d* that includes indicators for the amount of profit for a plurality of time periods, along with percentages of an average profit that are currently being reported for those time periods (e.g., the illustrated embodiment indicates that the main floor of the selected merchant physical location is currently making $0.04/second that is 45% of the average profit/second, $2.40/minute that is 86% of the average profit/minute, $144.00/hour that is 92% of the average profit/hour, $1152.00/day that is 89% of the average profit/day, and $6912.00/month that is 95% of the average profit/month.) The merchant physical location summary box 1804 may also include an information section 1804*e* for the selected merchant physical location that provides collected information about store revenue and total revenue, staff cost and store revenue, current number of staff and that number as a percentage of the average number of staff, current efficiency of staff and that number as a percentage of the average efficiency of staff, and/or any other information collected from the merchant action recommendation systems discussed above.

The cumulative merchant action recommendation screen 1800 also includes a recommendation box 1806 detailing a plurality of event 1806*a* occurring at the selected merchant physical location and recommendations 1806*b* for the selected merchant physical location. For example, the illustrated embodiment includes an event that indicates that an inventory shipment was received and unloaded early along with a recommendation that a "thanks" message be sent to the staff, an event that indicates the selected merchant physical location is running low on inventory along with a recommendation to order more of that inventor and an alternative to that inventory, an event that indicates that inventory is being unloaded slowly (which is projected to cost the merchant $104.23) and a recommendation to temporarily assign employees to unload that inventory (along with the cost to the merchant to temporarily assign those employees), and an event that indicates that a wait time is costing the merchant money and a recommendation to notify the staff, provide timed offers, and consider a new configuration of the selected merchant physical location.

The cumulative merchant action recommendation screen 1800 also includes a company summary box 1808 that includes a profit indicator 1808*a* for the combined merchant physical locations, average profits and costs/sales 1808*b* for the combined merchant physical locations, a chart 1808*c* that may chart the profits for the combined merchant physical locations, and efficiency numbers 1808*c* for the combined merchant physical locations. While an example of a cumulative merchant action recommendation screen 1800 displaying some information based on a selected merchant physical location has been provided, one of skill in the art in possession of the present disclosure will recognize that any merchant location and any information type may be selected to retrieve information, analysis, and recommendations using the information collected from the respective merchant action recommendation systems in those merchant physical locations. Furthermore, one of skill in the art in possession of the present disclosure will recognize that a wide variety of different information may be collected in merchant action recommendation systems of those merchant physical locations, and thus almost any merchant or customer metric may be reported using the cumulative merchant action recommendation screen 1800.

Thus, systems and methods for collecting merchant and customer information and using that information to provide merchant action recommendations has been provided that utilize a network of beacon devices that are configured to communication with beacon communication devices. Customers may utilize their customer mobile phones as customer beacon communication devices, while merchant beacon communication devices may be provided by the merchant on any merchant asset associated with the merchant. The communication between the beacon communication devices and the beacon devices collects any information that sensors in the beacon communication devices can sense, and in specific embodiments, collects location information for the customers and merchant assets in and around a merchant physical location to track the locations of the customers and merchant assets and analyzes changing locations to make recommendations to the merchant to perform specific actions. The systems and methods described herein give the merchant a granular view of their merchant physical location(s), and allow for the merchant to correct inefficiencies that might otherwise go unnoticed, increasing profits for the merchant.

Figure 19:
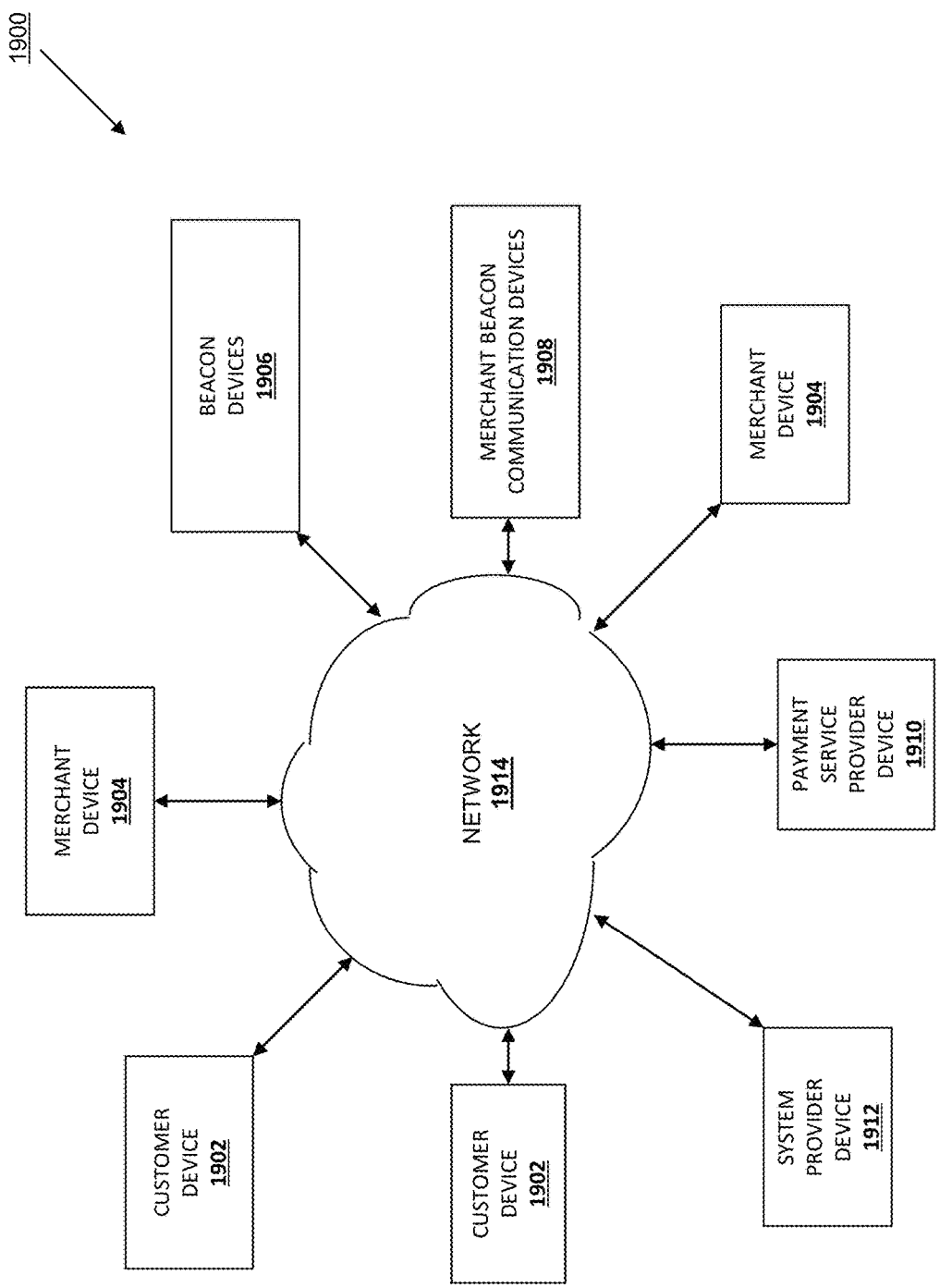
FIG. 19 is a schematic view illustrating an embodiment of a networked system.

Referring now to FIG. 19, an embodiment of a network-based system 1900 for implementing one or more processes described herein is illustrated. As shown, the network-based system 1900 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 19 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1900 illustrated in FIG. 19 includes a plurality of customer devices 1902, a plurality of merchant devices 1904, a plurality of beacon devices 1906, a plurality of merchant beacon communication devices 1908, a payment service provider device 1910, and/or a system provider device 1912 in communication over one or more networks 1914. The customer devices 1902 may be the customer devices discussed above and may be operated by the customers discussed above. The merchant devices 1904, beacon devices 1906, and merchant beacon communication devices 1908 may be the merchant devices, beacon devices, and merchant beacon communication devices discussed above and may be operated by the merchants discussed above. The payment service provider device 1910 may be the payment service provider devices discussed above and may be operated by a payment service provider such as, for example, PayPal Inc. of San Jose, Calif. The system provider devices 1912 may be the system provider devices discussed above and may be operated by the system providers discussed above.

The customer devices 1902, merchant devices 1904, beacon devices 1906, merchant beacon communication devices 1908, payment service provider device 1910, and/or system provider device 1912 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1900, and/or accessible over the network 1914.

The network 1914 may be implemented as a single network or a combination of multiple networks. For example, in various embodiments, the network 1914 may include the Internet and/or one or more intranets, landline networks, wireless networks, and/or other appropriate types of networks.

The customer devices 1902 may be implemented using any appropriate combination of hardware and/or software configured for wired and/or wireless communication over network 1914. For example, in one embodiment, the customer devices 1902 may be implemented as a personal computer of a user in communication with the Internet. In other embodiments, the customer devices 1902 may be a smart phone, personal digital assistant (PDA), laptop computer, and/or other types of computing devices.

The customer devices 1902 may include one or more browser applications which may be used, for example, to provide a convenient interface to permit the customer to browse information available over the network 1914. For example, in one embodiment, the browser application may be implemented as a web browser configured to view information available over the Internet.

The customer devices 1902 may also include one or more toolbar applications which may be used, for example, to provide user-side processing for performing desired tasks in response to operations selected by the customer. In one embodiment, the toolbar application may display a user interface in connection with the browser application.

The customer devices 1902 may further include other applications as may be desired in particular embodiments to provide desired features to the customer devices 1902. In particular, the other applications may include a payment application for payments assisted by a payment service provider through the payment service provider device 1910. The other applications may also include security applications for implementing user-side security features, programmatic user applications for interfacing with appropriate application programming interfaces (APIs) over the network 1914, or other types of applications. Email and/or text applications may also be included, which allow customer payer to send and receive emails and/or text messages through the network 1914. The customer devices 1902 includes one or more user and/or device identifiers which may be implemented, for example, as operating system registry entries, cookies associated with the browser application, identifiers associated with hardware of the customer devices 1902, or other appropriate identifiers, such as a phone number. In one embodiment, the user identifier may be used by the payment service provider device 1910 to associate the user with a particular account as further described herein.

The merchant devices 1904 may be maintained, for example, by a conventional or on-line merchant, conventional or digital goods seller, individual seller, and/or application developer offering various products and/or services in exchange for payment to be received conventionally or over the network 1914. In this regard, the merchant devices 1904 may include a database identifying available products and/or services (e.g., collectively referred to as items) which may be made available for viewing and purchase by the customer.

The merchant devices 1904 also includes a checkout application which may be configured to facilitate the purchase by the payer of items. The checkout application may be configured to accept payment information from the user through the customer devices 1902 and/or from the payment service provider through the payment service provider device 1910 over the network 1914.

Figure 20:
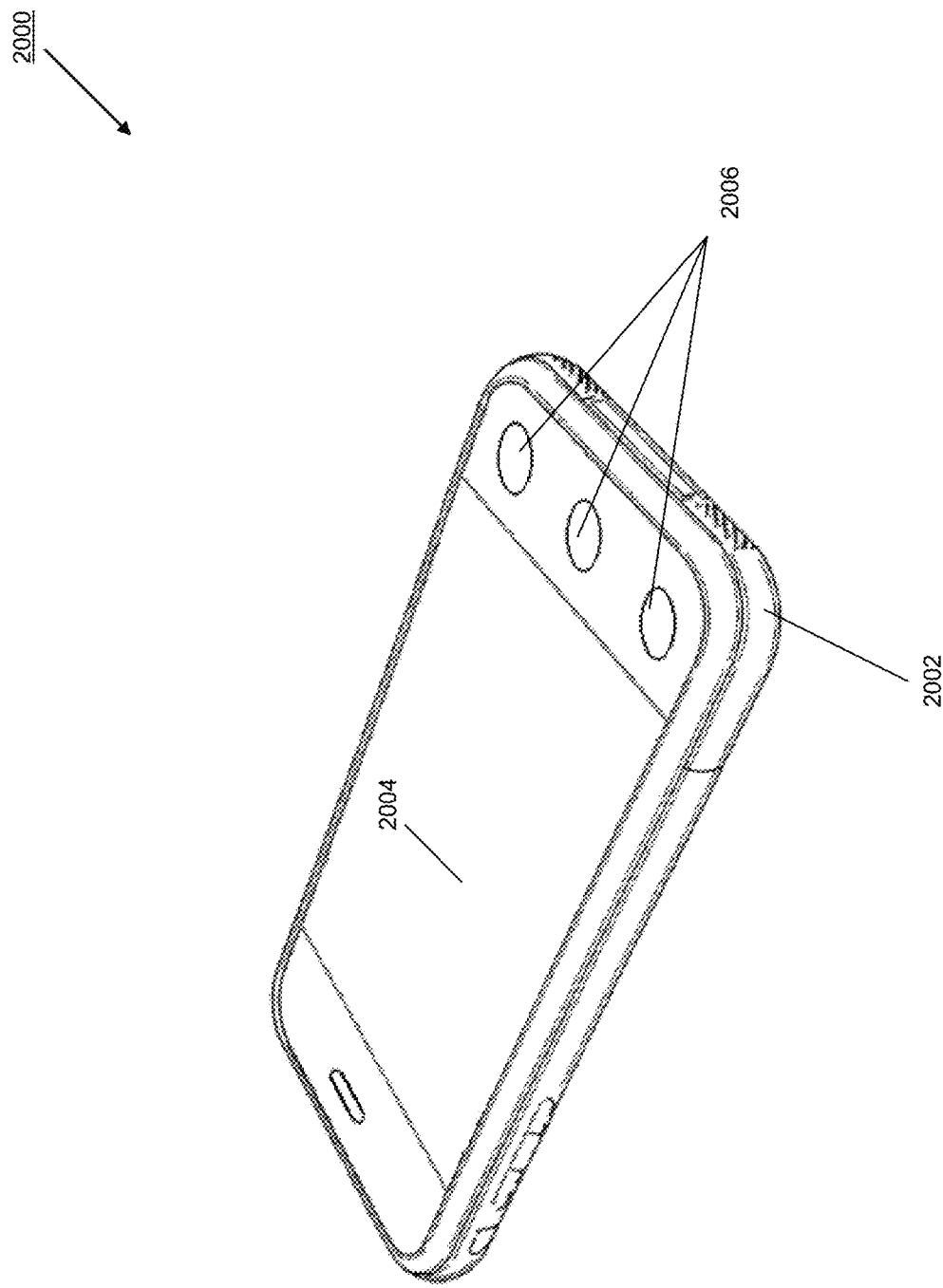
FIG. 20 is a perspective view illustrating an embodiment of a customer device.

Referring now to FIG. 20, an embodiment of a customer device 2000 is illustrated. The customer device 2000 may be the customer device 1902 discussed above. The customer device 2000 includes a chassis 2002 having a display 2004 and an input device including the display 2004 and a plurality of input buttons 2006. One of skill in the art will recognize that the customer device 2000 is a portable or mobile phone including a touch screen input device and a plurality of input buttons that allow the functionality discussed above with reference to the methods above. However, a variety of other portable/mobile customer devices and/or desktop customer devices may be used in the methods discussed above without departing from the scope of the present disclosure.

Figure 21:
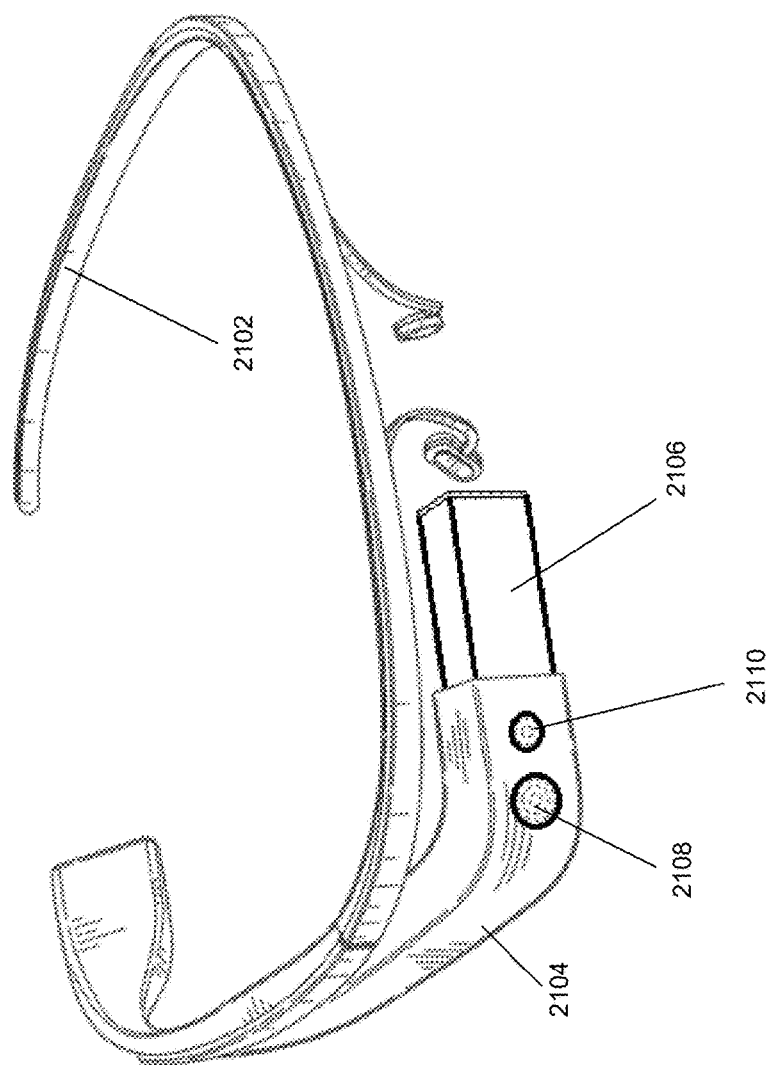
FIG. 21 is a perspective view illustrating an embodiment of a merchant device.
Figure 22:
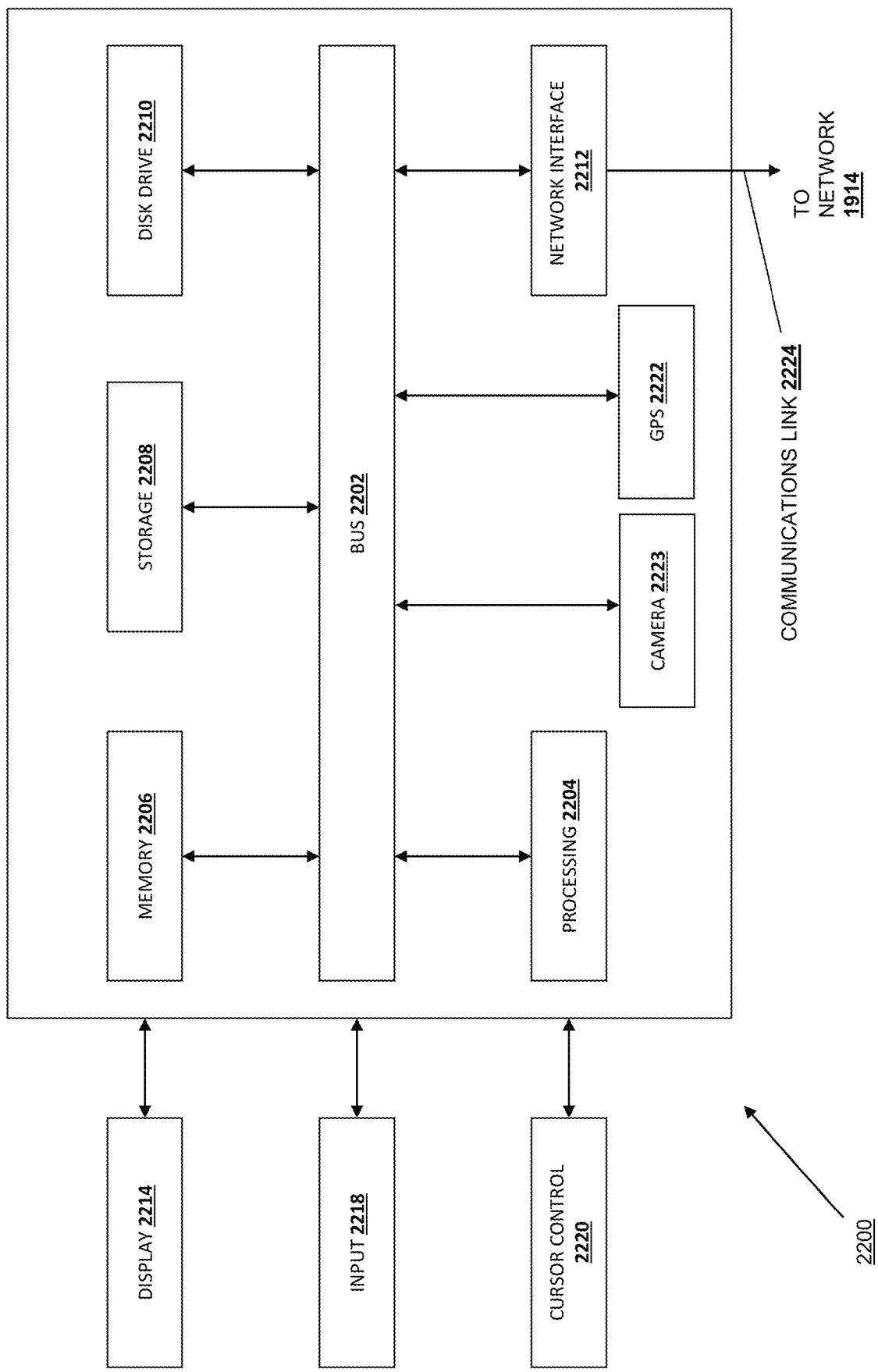
FIG. 22 is a schematic view illustrating an embodiment of a computer system.

Referring now to FIG. 21, an embodiment of a wearable merchant device 2100 is illustrated. The wearable merchant device 2100 may be the may be the wearable merchant devices, discussed above. The wearable merchant device 2100 includes a frame 2102 having a computing chassis 2104 that extends from the frame 2102, a display device 2106 that extends from the computing chassis 2104, a microphone 2108 located on the computing chassis 2104, and a camera 2110 located on the computing chassis 2104. One of skill in the art will recognize that the wearable merchant device 2100 is a mobile wearable merchant device such as, for example, Google Glass® available from Google Inc. of Mountain View, Calif. that may provide a user with the functionality discussed above with reference to the methods discussed above. However, a variety of other mobile wearable merchant devices may be used in the methods discussed above without departing from the scope of the present disclosure Referring now to FIG. 22, an embodiment of a computer system 2200 suitable for implementing, for example, the customer devices 1902, merchant devices 1904, beacon devices 1906, merchant beacon communication devices 1908, payment service provider device 1910, and/or system provider device 1912, is illustrated. It should be appreciated that other devices utilized by customers, merchants, beacon devices, merchant beacon communication devices, payment service providers, and/or system providers in the system discussed above may be implemented as the computer system 2200 in a manner as follows.

In accordance with various embodiments of the present disclosure, computer system 2200, such as a computer and/or a network server, includes a bus 202 or other communication mechanism for communicating information, which interconnects subsystems and components, such as a processing component 2204 (e.g., processor, micro-controller, digital signal processor (DSP), etc.), a system memory component 2206 (e.g., RAM), a static storage component 2208 (e.g., ROM), a disk drive component 2210 (e.g., magnetic or optical), a network interface component 2212 (e.g., modem or Ethernet card), a display component 2214 (e.g., CRT or LCD), an input component 2218 (e.g., keyboard, keypad, or virtual keyboard), a cursor control component 2220 (e.g., mouse, pointer, or trackball), a location determination component 2222 (e.g., a Global Positioning System (GPS) device as illustrated, a cell tower triangulation device, and/or a variety of other location determination devices known in the art), and/or a camera component 2223. In one implementation, the disk drive component 2210 may comprise a database having one or more disk drive components.

In accordance with embodiments of the present disclosure, the computer system 2200 performs specific operations by the processor 2204 executing one or more sequences of instructions contained in the memory component 2206, such as described herein with respect to the customer devices 1902, merchant devices 1904, beacon devices 1906, merchant beacon communication devices 1908, payment service provider device 1910, and/or system provider device 1912. Such instructions may be read into the system memory component 2206 from another computer readable medium, such as the static storage component 2208 or the disk drive component 2210. In other embodiments, hard-wired circuitry may be used in place of or in combination with software instructions to implement the present disclosure.

Logic may be encoded in a computer readable medium, which may refer to any medium that participates in providing instructions to the processor 2204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 2210, volatile media includes dynamic memory, such as the system memory component 2206, and transmission media includes coaxial cables, copper wire, and fiber optics, including wires that comprise the bus 2202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 2200. In various other embodiments of the present disclosure, a plurality of the computer systems 2200 coupled by a communication link 2224 to the network 1914 (e.g., such as a LAN, WLAN, PTSN, and/or various other wired or wireless networks, including telecommunications, mobile, and cellular phone networks) may perform instruction sequences to practice the present disclosure in coordination with one another.

The computer system 2200 may transmit and receive messages, data, information and instructions, including one or more programs (i.e., application code) through the communication link 2224 and the network interface component 2212. The network interface component 2212 may include an antenna, either separate or integrated, to enable transmission and reception via the communication link 2224. Received program code may be executed by processor 2204 as received and/or stored in disk drive component 2210 or some other non-volatile storage component for execution.

Figure 23:
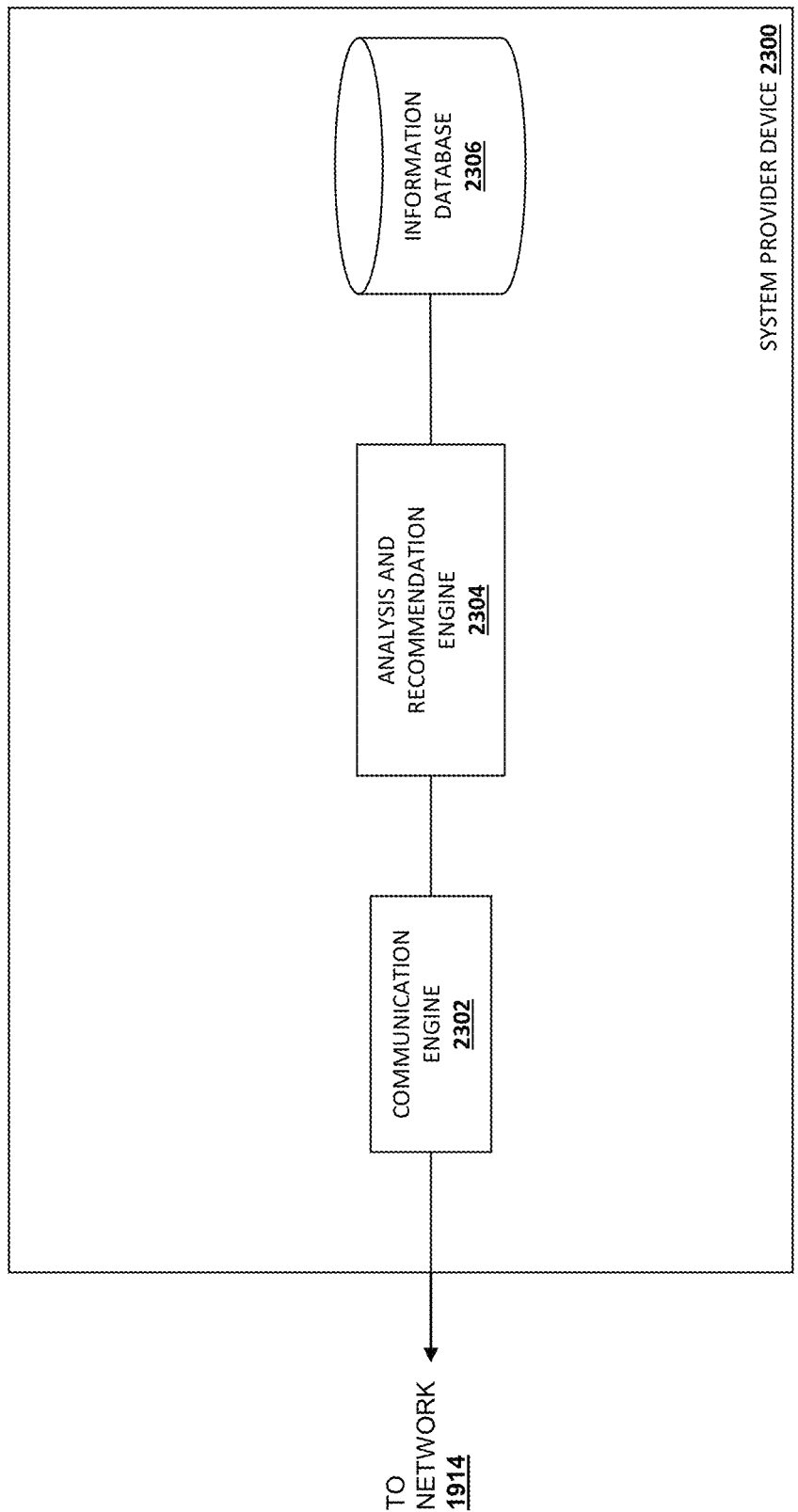
FIG. 23 is a schematic view illustrating an embodiment of a system provider device.

Referring now to FIGS. 23, an embodiment of a system provider device 2300 is illustrated. In an embodiment, the device 2300 may be the system provider device discussed above. The device 2300 includes a communication engine 2302 that is coupled to the network 1914 and to an analysis and recommendation engine 2304 that is coupled to an information database 2306. The communication engine 2302 may be software or instructions stored on a computer-readable medium that allows the device 2300 to send and receive information over the network 1914. The analysis and recommendation engine 2304 may be software or instructions stored on a computer-readable medium that is operable to collect information from the beacon devices, analyze that information and provide the information, analysis, and recommendations to the merchant as discussed above, as well as provide any of the other functionality that is discussed above. While the database 2306 has been illustrated as located in the device 2300, one of skill in the art will recognize that it may be connected to the analysis and recommendation engine 2304 through the network 1914 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory comprising instructions; and
   one or more hardware processors coupled to the non-transitory memory and configured to read the instructions to cause the system to perform operations comprising:
   detecting, during a first time period, a first device of a first user that is located at a first location within a physical merchant store associated with a merchant, wherein the first location is associated with a first product or service;
   detecting, via a network connection during the first time period, on a user interface page corresponding to the merchant and displayed on a second device, one or more online actions by a second user of the second device;
   determining that the one or more online actions by the second user of the second device correspond to the first product or service;
   generating and providing a user interface on a merchant device, wherein the user interface corresponds to a layout of the physical merchant store, wherein the user interface includes a first user interface element corresponding to the first product or service located in a first area of the user interface that corresponds to the first location of the physical merchant store, a second user interface element corresponding to the first device located in the first area of the user interface based on the first device being located at the first location within the physical merchant store, and a third user interface element corresponding to the second device located in the first area of the user interface based on the one or more online actions by the second user corresponding to the first product or service, and wherein the first user interface element, the second user interface element, and the third user interface element are displayed on the user interface at the same time;
   receiving, via the merchant device, a selection of at least one of the first user interface element, the second user interface element, or the third user interface element; and
   in response to receiving the selection, providing first information on the user interface, wherein the first information corresponds to at least one of the first product or service, the first user, or the second user.

2. The system of claim 1, the operations further comprising:
   determining one or more recommendations based on the detecting the one or more online actions by the second user and the detecting that the first device is located at the first location; and
   providing, via the user interface on the merchant device, the one or more recommendations.

3. The system of claim 2, wherein the one or more recommendations include a traffic pattern corresponding to the first product or service, and an amount of sales resulting from the determined traffic pattern.

4. The system of claim 1, wherein the first information corresponds to the first product or service, and wherein the first information includes product inventory information or transactional information corresponding to the first product or service.

5. The system of claim 1, wherein the first information corresponds to the first user, and wherein the first information includes previous transactional information associated with the first user.

6. The system of claim 1, wherein the second user interface element has a first appearance indicating that the first user is located in the physical merchant store, and wherein the third user interface element has a second appearance indicating that the second user is a virtual user of the user interface page.

7. The system of claim 1, the operations further comprising, based on determining that the first device has moved to a second location, updating information corresponding to the second user interface element on the user interface.

8. A non-transitory machine-readable medium having stored thereon machine-readable instructions executable to cause a machine to perform operations comprising:
   detecting, during a first time period, a first device of a first user that is located at a first location within a physical merchant store associated with a merchant, wherein the first location is associated with a first product or service;
   detecting, via a network connection during the first time period, on a user interface page corresponding to the merchant and displayed on a second device, one or more online actions by a second user of the second device;

determining that the one or more online actions by the second user of the second device correspond to the first product or service;

generating and providing a user interface on a merchant device, wherein the user interface corresponds to a layout of the physical merchant store, wherein the user interface includes a first user interface element corresponding to the first product or service located in a first area of the user interface that corresponds to the first location of the physical merchant store, a second user interface element corresponding to the first device located in the first area of the user interface based on the first device being located at the first location within the physical merchant store, and a third user interface element corresponding to the second device located in the first area of the user interface based on the one or more online actions by the second user, and wherein the first user interface element, the second user interface element, and the third user interface element are displayed on the user interface at the same time;

receiving, via the merchant device, a selection of at least one of the first user interface element, the second user interface element, or the third user interface element; and in response to receiving the selection, providing first information on the user interface, wherein the first information corresponds to the first product or service, the first user, or the second user.

9. The non-transitory machine-readable medium of claim 8, the operations further comprising:

determining one or more recommendations based on the detecting the one or more online actions by the second device and the detecting that the first device is located at the first location; and providing, via the user interface on the merchant device, the one or more recommendations.

10. The non-transitory machine-readable medium of claim 9, wherein the one or more recommendations include a traffic pattern corresponding to the first product or service, and an amount of sales resulting from the determined traffic pattern.

11. The non-transitory machine-readable medium of claim 8, wherein the first information corresponds to the first product or service, and wherein the first information includes product inventory information or transactional information corresponding to the first product or service.

12. The non-transitory machine-readable medium of claim 8, wherein the first information corresponds to the first user, and wherein the first information includes previous transactional information associated with the first user.

13. The non-transitory machine-readable medium of claim 8, wherein the second user interface element has a first visual characteristic indicating that the first device is located at the physical merchant store, and wherein the third user interface element has a second visual characteristic indicating that the second user is a virtual user of the user interface page.

14. The non-transitory machine-readable medium of claim 8, the operations further comprising, based on determining that the first device has moved to a second location, updating information corresponding to the first user interface element on the user interface.

15. A method, comprising:

detecting, during a first time period, a first device of a first user that is located at a first location within a physical merchant store associated with a merchant, wherein the first location is associated with a first product or service;

detecting, via a network connection during the first time period, on a user interface page corresponding to the merchant and displayed on a second device, one or more online actions by a second user of the second device associated with a second user, wherein the one or more online actions by the second user of the second device correspond to the first product or service;

generating and providing a user interface on a merchant device, wherein the user interface includes a first user interface element corresponding to the first product or service, a second user interface element corresponding to the first user, and a third user interface element corresponding to the second user, and wherein the first user interface element, the second user interface element, and the third user interface element are displayed on the user interface at the same time;

receiving, via the merchant device, a selection of at least one of the first user interface element, the second user interface element, or the third user interface element; and in response to receiving the selection, providing first information on the user interface, wherein the first information corresponds to the first product or service, the first user, or the second user.

16. The method of claim 15, further comprising:

determining one or more recommendations based on the detecting the one or more online actions by the second user and the detecting that the first device is located at the first location; and providing, via the user interface on the merchant device, the one or more recommendations.

17. The method of claim 16, wherein the one or more recommendations include a traffic pattern corresponding to the first product or service, and an amount of sales resulting from the determined traffic pattern.

18. The method of claim 15, wherein the first information corresponds to the first product or service, and wherein the first information includes product inventory information or transactional information corresponding to the first product or service.

19. The method of claim 15, wherein the first information corresponds to the first user, and wherein the first information includes previous transactional information associated with the first user.

20. The method of claim 15, wherein the second user interface element has a first visual characteristic indicating that the first device is located in the physical merchant store, and wherein the third user interface element has a second visual characteristic indicating that the second user is a virtual user of the user interface page.

* * * * *

UNITED STATES PATENT AND TRADEMARK OFFICE
CERTIFICATE OF CORRECTION

PATENT NO. : 11,720,841 B2
APPLICATION NO. : 17/385897
DATED : August 8, 2023
INVENTOR(S) : Ares Sakamoto It is certified that error appears in the above-identified patent and that said Letters Patent is hereby corrected as shown below:

In the Claims

Claim 9, Column 35, Line 33, change "device and the detecting" to --user and the detecting--.

Signed and Sealed this
Nineteenth Day of September, 2023

Katherine Kelly Vidal
Director of the United States Patent and Trademark Office